(12) United States Patent  
Hirose et al.

(10) Patent No.: US 7,829,178 B2  
(45) Date of Patent: Nov. 9, 2010

(54) DELAMINATION DEVELOPMENT PREVENTABLE STRUCTURE FOR SANDWICH PANEL

(75) Inventors: Yasuo Hirose, Kagamigahara (JP); Masaki Hojo, Kyoto (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 516 days.

(21) Appl. No.: 11/887,010

(22) PCT Filed: Mar. 31, 2006

(86) PCT No.: PCT/JP2006/306802

§ 371 (c)(1),
(2), (4) Date: Sep. 24, 2007

(87) PCT Pub. No.: WO2006/106904

PCT Pub. Date: Oct. 12, 2006

(65) Prior Publication Data

US 2009/0022935 A1      Jan. 22, 2009

(30) Foreign Application Priority Data

Apr. 1, 2005      (JP)  .............................. 2005-106280

(51) Int. Cl.
*B32B 3/28*       (2006.01)
*B32B 3/30*       (2006.01)
*B32B 3/00*       (2006.01)
*B32B 3/12*       (2006.01)
*B32B 3/26*       (2006.01)

(52) U.S. Cl. ........................ 428/167; 428/156; 428/158; 428/161; 428/162; 428/163

(58) Field of Classification Search ................. 428/156, 428/157, 158, 159, 161, 162, 163, 188, 167; 52/783.1, 783.11
See application file for complete search history.

(56) References Cited

U.S. PATENT DOCUMENTS 3,043,730 A  *  7/1962  Mountford  .................. 428/159

FOREIGN PATENT DOCUMENTS

| EP | 1081305 A1 * | 3/2001 |
| JP | U-58-073817  | 5/1983 |
| JP | A-63-162350  | 7/1988 |
| JP | A-03-247859  | 11/1991 |

(Continued)

*Primary Examiner*—David R Sample
*Assistant Examiner*—Catherine Simone
(74) *Attorney, Agent, or Firm*—Oliff & Berridge, PLC

(57) ABSTRACT

A delamination development preventable structure is provided to prevent the development of delamination in a sandwich panel including a core and surface plates attached to the opposite surfaces of the core with respect to the thickness of the core.

Arresters 5 are protruded inward with respect to directions parallel to the thickness of a core 3 from surface plates 4a and 4b. The development of a delaminated part formed by the separation of a part of the surface plate 4a from the core 3 and that of a delaminated part formed by the separation of a part of the surface plate 4b from the core 3 beyond the arresters 5 can be prevented. Thus delamination can be limited to a narrow local region and the spread of the delaminated part over the entire sandwich panel 2 can be prevented. Thus the development of delamination in the sandwich panel 2 can be prevented and the durability of the sandwich panel 2 can be enhanced.

22 Claims, 15 Drawing Sheets

FOREIGN PATENT DOCUMENTS

| | | |
|---|---|---|
| JP | A-05-309792 | 11/1993 |
| JP | A-08-207190 | 8/1996 |
| JP | A-11-254566 | 9/1999 |
| JP | A-2003-146252 | 5/2003 |

* cited by examiner

DELAMINATION DEVELOPMENT PREVENTABLE STRUCTURE FOR SANDWICH PANEL

TECHNICAL FIELD

The present invention relates to a structure for preventing the development and spread of a delaminated part occurred in a sandwich panel formed by bonding together surface plates with a core between them.

BACKGROUND ART

A foam core sandwich panel will be used, for example, as a structural material for forming airframes of airplanes. The foam core sandwich panel is formed by bonding together surface plates of a fiber-reinforced composite material with a foam synthetic resin core between them. The foam core sandwich panel is an excellent structural material useful for reducing weight and parts and free from a defect that permits water penetration in honeycomb core sandwich panels.

Although the foam core sandwich panel is an excellent structural material as mentioned above, it is possible that an interfacial crack between the surface plate and the core occurred in a part of the foam core sandwich panel propagates because the surface plates and the core are bonded. There has not been proposed any structure for preventing progressive delamination in the foam core sandwich panel.

DISCLOSURE OF THE INVENTION

Problem to be Solved by the Invention

It is an object of the present invention to provide a delamination development preventable structure (interfacial crack propagation preventing structure for a sandwich panel formed by bonding together surface plates of a composite material with a core of a foam synthetic resin between them.

Means for Solving the Problem

The present invention provides a delamination development preventable structure for a sandwich panel including: a core of a foam synthetic resin; two surface plates bonded respectively to opposite surfaces of the core with respect to a direction parallel to the thickness of the core; and delamination development preventing members protruded inward from the inner surfaces of the surface plates so as to sink into the core with respect to directions parallel to the thickness of the core, respectively.

According to the present invention, the delamination development preventing members are protruded inward from the surface plates and so as ti sink into the core with respect to directions parallel to the thickness of the core, respectively. Even if the surface plate is separated from the core and a delaminated part is formed in the sandwich panel and the delaminated part develops as far as the delamination development preventing member, the delamination development preventing member can prevent the further development of the delaminated part. Thus delamination can be limited to a narrow local area and the spread of delamination over the entire sandwich panel can be prevented. The progressive development of a delaminated part in the sandwich panel can be thus prevented to enhance the durability of the sandwich panel.

In the sandwich panel according to the present invention, the delamination development preventing members are sunk into the core with respect to directions parallel to the thickness of the core, respectively, by a depth not greater than half the thickness of the core.

According to the present invention, each of the delamination development preventing members can be sunk into the core by holding the delamination development preventing member between the core and the surface plate and bonding the core and the surface plate together. Thus the delamination development preventing members can be easily incorporated into the sandwich panel without requiring troublesome work. Thus the delamination development preventable structure can be easily built.

In the sandwich panel according to the present invention, the delamination development preventing members are extended between the surface plates.

According to the present invention, the surface plates can be interconnected by the delamination development preventing members extended across the core between the surface plates. The delamination development preventing members can prevent the development of delamination and can reinforce the sandwich panel. Thus the delamination development preventing members are capable of enhancing the durability of the sandwich panel as well as of preventing the development of delamination.

In the sandwich panel according to the present invention, the surface of each of the delamination development preventing members facing the core is a smoothly continuous, unbent surface.

According to the present invention, the surfaces of the delamination development preventing members do not have any bends and hence any bends that cause stress concentration in the core are not formed. Thus the delamination development preventing members will not exert any detrimental effect on the core. The smoothly continuous, unbent surface of the delamination development preventing member facing the core is a continuous flat or curved surface not having any sharp edges.

In the sandwich panel according to the present invention, the core is provided in its middle part with respect to thickness with a flat auxiliary delamination development preventing member parallel to the surface plates.

According to the present invention, the auxiliary delamination development preventing member is extended in the middle part with respect to thickness of the core. Even if the separation of the surface plate from the core causes cracks in the core, the auxiliary delamination development preventing member can prevent the development of cracks beyond the auxiliary delamination development preventing member. The growth of cracks across the core can be prevented. Thus three-dimensional delamination development prevention can be achieved.

Effect of the Invention

According to the present invention, the delamination development preventing members prevent the progressive development of delamination occurred in a part of the sandwich panel over the entire sandwich panel. Thus the sandwich panel has high durability.

According to the present invention, the delamination development preventing member can be held between the core and the surface plate by sandwiching the delamination development preventing member between the core and the surface plate. Thus the delamination development preventing members can be easily incorporated into the sandwich panel without requiring troublesome work. Thus the delamination development preventable structure can be easily fabricated without requiring any troublesome work.

According to the present invention, the delamination development preventing members are capable of reinforcing the sandwich panel as well as of preventing the development of delamination. Thus the sandwich panel has high durability.

According to the present invention, the delamination development preventing members do not have any bends that cause stress concentration in the core. Thus the delamination development preventing members do not exert any detrimental effect on the core and hence the sandwich panel having satisfactory properties can be provided.

According to the present invention, the auxiliary delamination development preventing member prevents the development of cracks across the core by delamination. Thus three-dimensional delamination development preventing effect can be attained.

Figure 1:
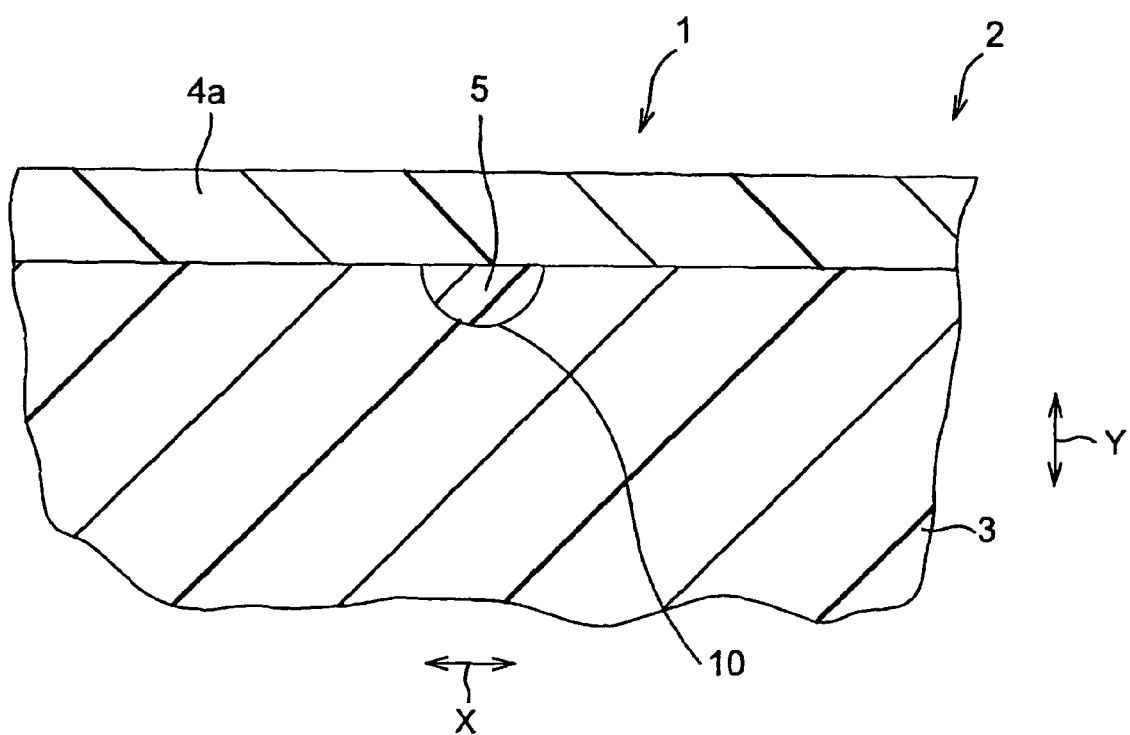
FIG. 1 is a sectional view of a delamination development preventable structure 1 in a first embodiment according to the present invention.

REFERENCE CHARACTERS 1, 1A to 1C: Delamination development preventable structures
2: Sandwich panel
3: Core
4a and 4b: Surface plates
5: Arrester (Delamination development preventing member)
5E: Auxiliary arrester
6 and 7: Arresting parts
10: Surface of the arrestor contiguous with the core
12: Groove
13: Reinforcing member
20: Airplane
21: skin
30: analytical model
60: Specimen
72 and 73: Cores

BEST MODE FOR CARRYING OUT THE INVENTION

Figure 2:
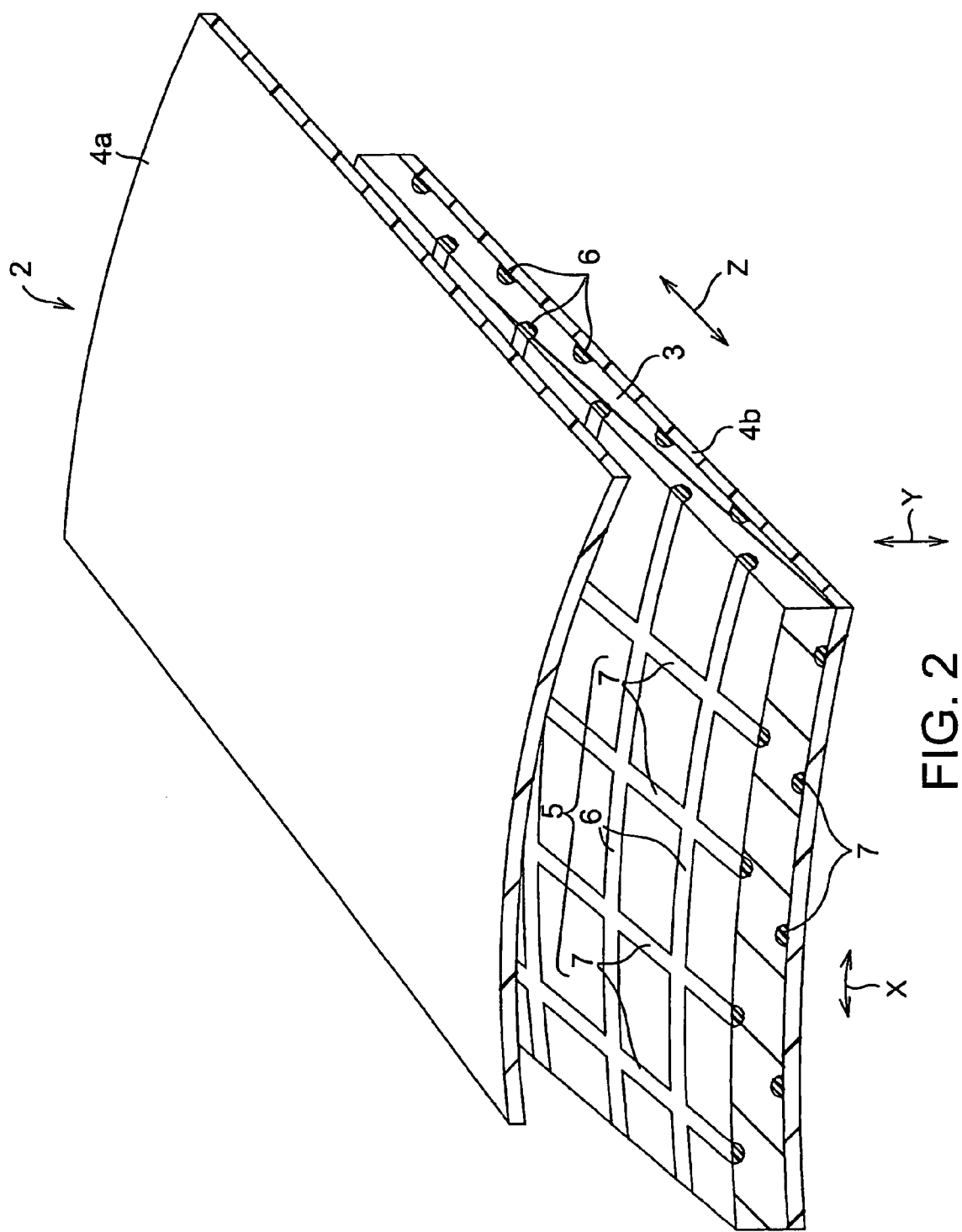
FIG. 2 is a partly cutaway perspective view of a sandwich panel 2 having the delamination development preventable structure 1.

FIG. 1 is a sectional view of a delamination development preventable structure 1 in a first embodiment according to the present invention and FIG. 2 is a partly cutaway perspective view of a sandwich panel 2 having the delamination development preventable structure 1. The sandwich panel (hereinafter, referred to sometimes simply as "panel") 2 is a structural material for building a structure. The sandwich panel 2 is particularly suitable for building a lightweight structure having a high rigidity. The panel 2 is formed by bonding surface plates 4a and 4b to the opposite surfaces, with respect to thickness, of a core 3, respectively. In the following description directions parallel to the surface of the surface plates 4a and 4b are first directions X, directions perpendicular to the first directions X and parallel to the surface plates 4a and 4b are second directions Z, and directions perpendicular to the first directions X and the second directions Z are third directions Y. The third directions Y are parallel to the thickness of the panel 2 and are referred to sometimes as "thickness directions Y". An imaginary plane substantially parallel to the first directions X and the second directions Z, namely, an imaginary plane parallel to the surface plates 4a and 4b, will be referred to as "reference plane".

The core 3 is a core of a foam synthetic resin called a foam core. Although there are not any particular restrictions on the foam synthetic resin, the foam synthetic resin may be a foam polyetherimide resin (PEI resin) or a polyvinyl chloride resin (PVC resin). The foam synthetic resin may be either a closedcell foam synthetic resin or an open-cell foam synthetic resin. The surface plates 4a and 4b are made from a composite material, more concretely, a fiber-reinforced composite material. The fiber-reinforced composite material is obtained by impregnating a base made from reinforcing fibers with a matrix resin. Although there are not any particular restrictions, the reinforcing fibers may be, for example, carbon fibers or glass fibers. The base may be a unidirectional sheet reinforced with unidirectionally oriented reinforcing fibers or a multidirectional sheet with randomly oriented reinforcing fibers. Thus the base may be a two-dimensional or three dimensional woven or knitted fabric. The matrix resin may be an epoxy resin.

The delamination development preventable structure 1 prevents the progressive development of delamination in the panel 2. In some cases, the surface plates 4a and 4b separates from the core 3 when an external force is exerted on the panel 2. The delamination development preventable structure 1 prevents the further development of such delamination even if a further external force is exerted on the panel 2. The delamination development preventable structure 1 includes arresters 5, namely, a delamination development preventing members. The arresters 5 protrude from the inner surfaces of the surface plates 4a and 4b in opposite third directions, respectively, toward each other.

In this embodiment, the arresters 5 are ridges protruding from the inner surfaces of the surface plates 4a and 4b, respectively, so as to sink in a depth into the core 3 in the thickness directions Y, respectively, and extending along the inner surfaces of the surface plates 4a and 4b facing the core 3. Thus the arresters 5 are elongate ribs of a filler. More concretely, the arresters 5 are extended on the inner surfaces of the surface plates 4a and 4b in a grid. The arresters 5 are straight ridges when the panel 2 is flat panel. When the panel 2 is a curved panel, the arresters are straight or curved ridges extending along a curved surface corresponding to the curved panel 2.

The arresters 5 protruding from the inner surface of the surface plate 4a include parallel first-direction fractional arresters 6 parallel to the first directions X, and parallel second-direction fractional arresters 7 parallel to the second directions Z. The first directions X and the second directions Z intersect each other, that is, the first directions X and the second directions Z are perpendicular to each other. Therefore, the first-direction fractional arresters 6 and the second-direction fractional arresters 7 intersect each other, and are joined at the intersections. The arresters 5 protruding from the inner surface of the surface plate 4b are similar in construction to those on the surface plate 4a. The arresters 5 on the surface plate 4b include parallel first-direction fractional arresters 6 parallel to the first directions X, and parallel second-direction fractional arresters 7 parallel to the second directions Z.

The first-direction fractional arresters 6 protruding from the surface plate 4a and those protruding from the other surface plate 4b are dislocated relative to each other with respect to the second directions Z such that the first-direction fractional arresters 6 on the surface plate 4a and those on the surface plate 4b are arranged alternately with respect to the second directions Z. The second-direction fractional arresters 7 protruding from the surface plate 4a and those protruding from the other surface plate 4b are dislocated relative to each other with respect to the second directions Z such that the second-direction fractional arresters 7 on the surface plate 4a and those on the surface plate 4b are arranged alternately with respect to the first directions X.

Although there are not particular restrictions on the shapes of the fractional arresters 6 and 7 of the arresters 5, the fractional arresters 6 and 7 have a substantially semicircular cross section. Parts of the fractional arresters 6 and 7 corresponding to the chord of the semicircular cross section are contiguous with the surface plates 4a and 4b. The surfaces 10 of the fractional arresters 6 and 7 contiguous with the core 3 correspond to the semicircle of the semicircular cross section. The surfaces 10 are substantially cylindrical surfaces. The fractional arresters 6 and 7 merge smoothly into each other at the intersections of the fractional arresters 6 and 7. At least any outward convex bends are not formed at all in the surfaces 10 of the arresters 5 contiguous with the core 3 in this embodiment. The surfaces 10 are smoothly continuous, unbent surfaces.

Although there are not particular restrictions on the material of the arresters, the material of the arresters 5 may be, for example, a fiber-reinforced composite material formed of the same combination of reinforcing fibers and a matrix resin as the surface plates 4a and 4b. When the material is a fiber-reinforced composite material, the reinforcing fibers of the fiber-reinforced composite material are unidirectionally oriented in directions in which the fractional arresters 6 and 7 are extended. When the material is a resin sheet, the resin sheet may be made of the same matrix resin as the surface plates 4a and 4b, such as an epoxy resin. When the arresters 5 are made of the same fiber-reinforced composite material or the same matrix resin as the surface plates 4a and 4b, the surface plates 4a and 4b and the arresters 5 can be integrally formed and the arresters 5 can be securely combined with the surface plates 4a and 4b.

Figure 3:
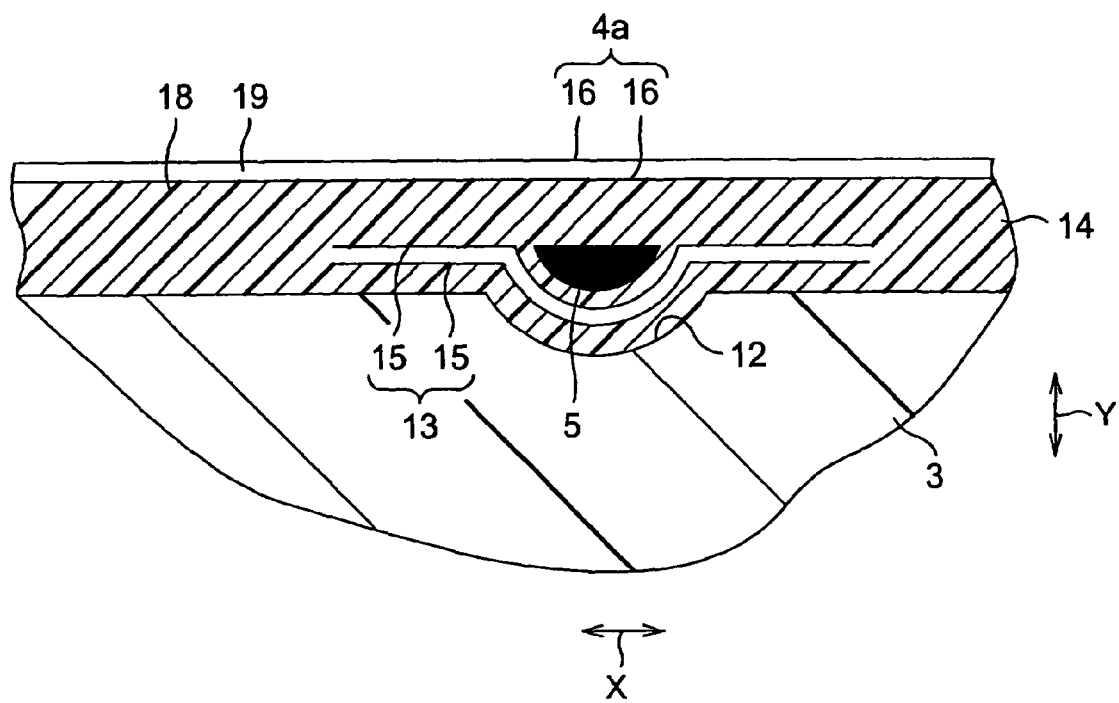
FIG. 3 is a sectional view showing the laminated structure of the sandwich panel 2.

FIG. 3 precisely shows the laminated construction of the sandwich panel 2 in a sectional view. The core 3 is provided in its opposite surfaces with respect to the thickness directions Y with grooves 12 formed in the shape of a grid. The grooves 12 are covered with reinforcing members 13 made of a fiber-reinforced composite material similarly to the surface plates 4a and 4b. the arresters a5 are placed on parts of the reinforcing members covering the grooves 12. The surface plates 4a and 4b cover the surfaces of the core 3 and are bonded to the core 3 with adhesive layers 14. Thus the arresters 5 and the reinforcing members 13 are united together. The adhesive layers 14 may be sheets of an adhesive. In this embodiment, the adhesive layers 14 are layers of a resin exuded from the reinforcing members 13.

Each of the surface plates 4a and 4b is a two-layer plate having a first layer 18 on the side of the reinforcing member 13 and a second layer 19 on the outer side. Each of the layers 18 and 19 has a base made from a two-dimensional woven fabric in which reinforcing fibers extend perpendicularly. The reinforcing fibers of the first layer 18 include fibers extending substantially parallel to the first-direction fractional arresters 6 and those extending substantially parallel to the second-direction fractional arresters 7. The reinforcing fibers of the second layer 19 include fibers extending in a direction deviating in a clockwise direction through about 45° from the direction as viewed in the thickness direction Y, namely, a direction from the surface plate 4a toward the surface plate 4b, in which the first-direction fractional arresters 6 extend and fibers extending in a direction deviating in a clockwise direction through about 45° from the direction in which the second-direction fractional arresters 7 extend.

A process for fabricating the panel 2 will be described. The grooves 12 are formed in grids in the opposite surfaces, with respect to the thickness direction Y of the core 3. Several reinforcing prepregs 15 for the fiber-reinforced composite material of the reinforcing members 13 are placed in layers in the grooves 12. The grooves 12 holding the reinforcing prepregs 15 in layers are filled up with the material of the arresters 5. Plate-forming prepregs 16 for the fiber-reinforced composite material of the surface plates 4a and 4b are placed in several layers on the core 3 to form a layered structure. The layered structure is compressed with respect to the thickness direction Y under heat to solidify the prepregs 15 and 16. Thus the core 3, the surface plates 4a and 4b, the arresters 5 and the reinforcing members 13 are united together to complete the panel 2. In FIG. 3, the prepregs 15 and 16 are represented by lines and the thickness of the adhesive layer 14 is exaggerated to facilitate understanding.

The prepreg 15 may be used in a single layer or may be omitted.

Figure 4:
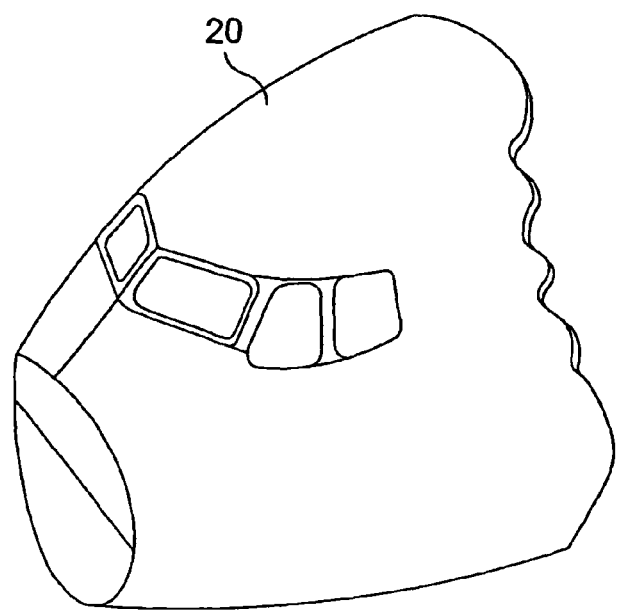
FIG. 4 is a fragmentary perspective view of an airplane 20.
Figure 5:
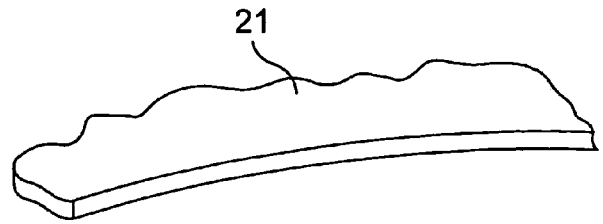
FIG. 5 is a fragmentary perspective view of the skin 21 of the airplane 20.

FIG. 4 is a perspective view of a part of an airplane 20 and FIG. 5 is a fragmentary perspective view of a skin 21 for the airplane 20. The sandwich panel 2 of the present invention is used widely for building structures. Structure for which the sandwich panel 2 is used is not limited. The sandwich panel 2 will be described as applied to the skin 21 of the airplane 20 by way of example. The sandwich panel 2 can be formed in two-dimensional and three-dimensional shapes. The sandwich panel 2 is suitable for use as the skin 21 of the airplane 20 on which a strong external force, such as an air resistance, acts and which needs to be formed in a three-dimensional, streamline shape to reduce air resistance that will act thereon.

Figure 6:
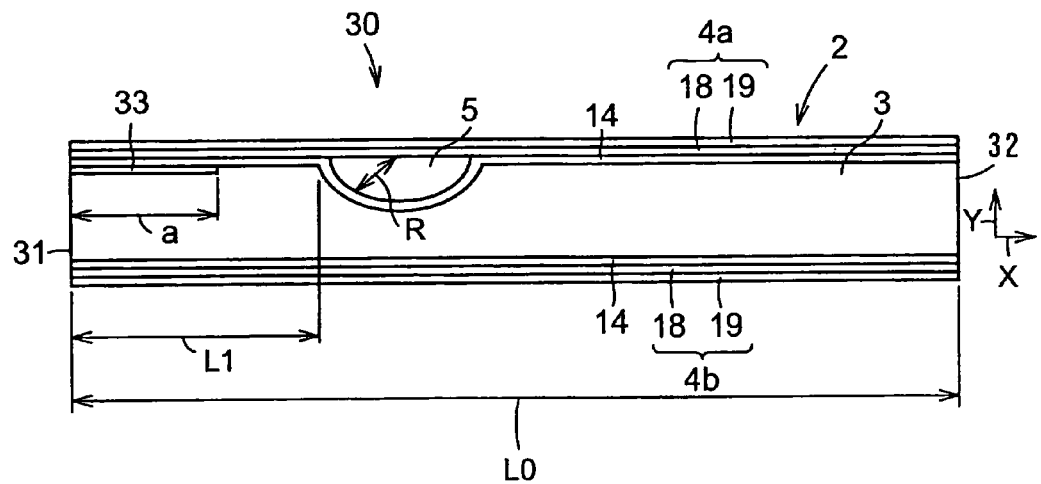
FIG. 6 is a typical view of an analytical model for examining the effect of an arrester 5.
Figure 7:
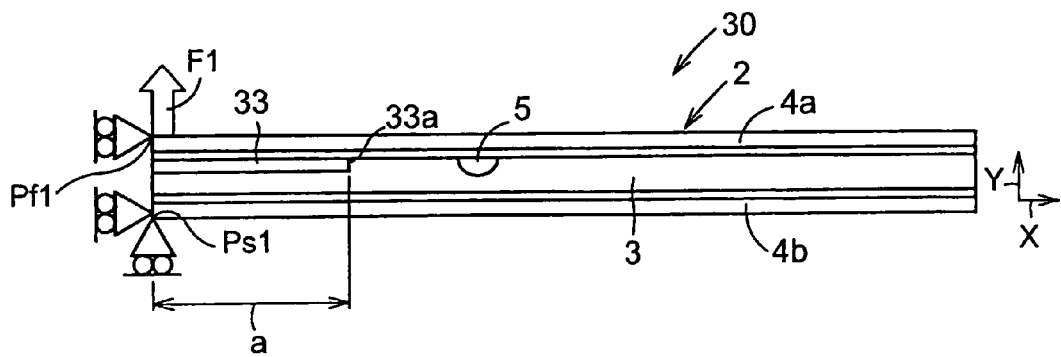
FIG. 7 is a view of assistance in explaining loading the analytical model 30 in a loading mode I.
Figure 8:
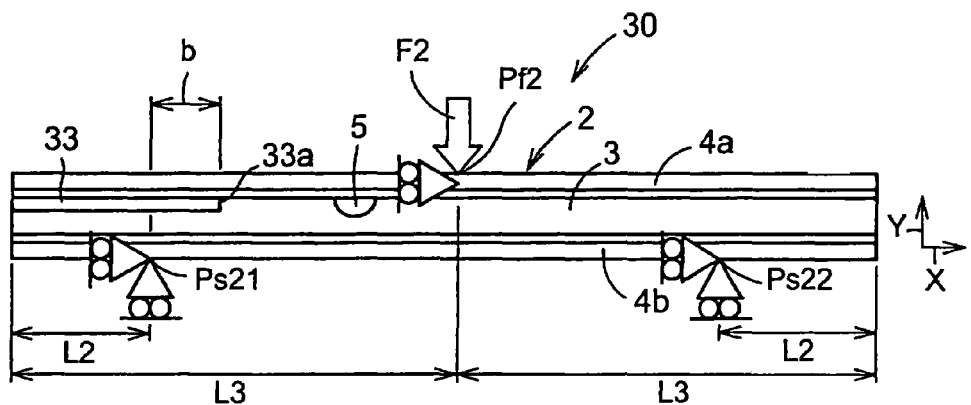
FIG. 8 is a view of assistance in explaining loading the analytical model 30 in a loading mode II.

FIG. 6 shows an analytical model 30 for examining the effect of the arresters 5, FIG. 7 is a view of assistance in explaining loading the analytical model 30 in a loading mode I and FIG. 8 is a view of assistance in explaining loading the analytical model 30 in a loading mode II. In FIGS. 6 to 8, dimensions of the components of the analytical model 30 are shown in a dimensional ratio different from the actual dimensional ratio to facilitate understanding. The inventors of the present invention developed the analytical model 30 shown in FIG. 6 simulating the panel 2 to examine the effect of the arresters 5 and the delamination development preventing effect of the arrestors 5 was evaluated by a finite element method (FEM). Components of the analytical model 30 corresponding to those of the panel 2 are designated by the same reference characters, respectively.

In the analytical model 30, surface plates 4a and 4b are placed on the opposite surfaces with respect to the thickness directions Y of a core 3 and are bonded to the core 3 with adhesive layers 14. An arrester 5 is protruded from the inner surface of the surface panel 4a in the thickness direction Y toward the core 3. The arrester 5 extends in the second direction Z perpendicularly into the paper. The arrester 5 has a semicircular cross section of a radius R. A part of the arrester corresponding to the chord of the semicircular cross section is contiguous with the surface plates 4a. In the analytical model 30, any adhesive layer 14 is not formed between the core 3 and the arrester 5. Each of the surface plates 4a and 4b has a first layer 18 on the side of the core 3 and a second layer 19 on the outer side. The first layer 18 has a base made from a two-dimensional woven fabric having reinforcing fibers extending in the first direction X and in a direction perpendicular to the first direction X in the reference plane. The second layer 19 has a base made from a two=-dimensional woven fabric having fibers extending at ±45° to the first direction X in the reference plane.

In the analytical model 30, the panel 2 has a length L of 300 mm along the first direction X. The arrester 5 is positioned at a distance L1 from a first end 31 with respect to the first direction X of the panel 2. The distance L1 is equal to the length of a part of the adhesive layer 14 contiguous with the core 3 extending between a side of the arrester 5 on the side of the first end 31 with respect to the first direction X and the first end 31. The distance L1 is 100 mm. It is supposed that the surface panel 4a separated from the core 3, more specifically, from the adhesive layer 14 bonding the surface plate 41 to the core 3 in a delaminated part 33 of a separation length a from the first end 31 of the panel 2 with respect to the first direction X toward a second end 32 with respect to the first direction X in the analytical model 30.

The respective thicknesses of the core 3, the surface plates 4a and 4b and the adhesive layer do not have significant effect on the results of analysis. The respective thicknesses of the core 3 and the surface plates 4a and 4b are neglected.

External forces were applied to the analytical model 30 to load the analytical model 30 in the first loading mode I as shown in FIG. 7. The development of delamination when the analytical model 30 was loaded in the first loading mode I was evaluated. The first end 31 with respect to the first direction X and the outer surface, apart from the core 3, of the surface plate 4b intersect each other at an edge Ps1. The first end 31 with respect to the first direction X and the outer surface, apart from the core 3, of the surface plate 4a intersect each other at an edge Pf1. The first loading mode I holds the panel 2 such that the edge Ps1 is immovable and applies a peeling force F1 to the edge Pf1 in the thickness direction Y from the surface plate 4b toward the surface plate 4a. The second loading mode II holds the panel 2 such that parts Ps21 and Ps22 of the outer surface, apart from the core 3, of the surface plate 4b at distances L2 respectively from the opposite ends 31 and 32 in the first directions X are immovable in the first directions X and the thickness directions Y and applies a shearing force F2 to a middle part Pf2 with respect to the first direction X in the outer surface, apart from the core 3, of the surface plate 4a in a direction from the surface panel 4a toward the surface panel 4b. In the second loading mode II, the distances L2 of the parts Ps21 and Ps22, where the panel 2 is supported, respectively from the opposite ends 31 and 32 in the first directions X are 50 mm. The part Pf2 to which the shearing force F2 is applied is at equal distances L3 of 150 mm from the opposite ends 31 and 32.

The delaminated part 33 develops if energy release rate G at the leading end 33a of the delaminated part 33 is not smaller than the fracture toughness $G_c$ of the bonded layers ($G \geqq G_c$). Energy release rate G is related with the amount of energy necessary for causing the delaminated part 33. Fracture toughness $G_c$ is related with the physical value of the panel 2 resisting the development of the delaminated part 33. Therefore, the development of the delaminated part 33 can be prevented when the energy release rate G of the leading end 33a of the delaminated part 33 is reduced below the fracture toughness $G_c$ ($G < G_c$). delamination development prevention includes delamination development suppression. The delamination development preventing effect of the arrester 5 was evaluated on the basis of the energy release rates G measured when the panel 2 was loaded in the first loading mode I and the second loading mode II.

Figure 9:
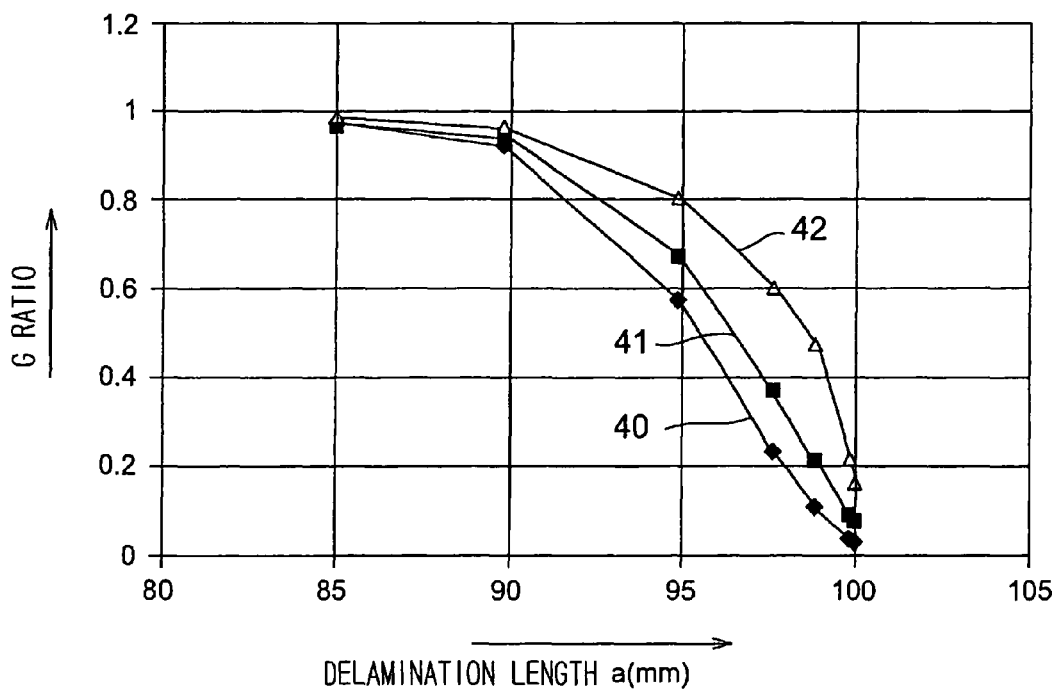
FIG. 9 is a graph showing the variation of G value ratio with delamination length (crack length) a when the analytical model 30 is loaded in the loading mode I.

FIG. 9 is a graph showing the variation of G ratio with delamination length a for panels respectively provided with arresters 5 respectively having radii R of 10 mm, 5 mm and 2.5 mm when the panels were loaded in the loading mode I. Each of the arresters 5 had a base made from a carbon-fiber-reinforced unidirectional composite material. In FIG. 9, energy release rate G is measured on the vertical axis and delamination length a is measured on the horizontal axis. In FIG. 9, a curve 40 with solid rhombuses ♦ is for the arrester 5 having a radius R of 10 mm, a curve 41 with solid squares ■ is for the arrester 5 having a radius R of 5 mm and a curve 42 with blank triangles Δ is for the arrester 5 having a radius R of 2.5 mm. G ratio is the ratio of the energy release rate G at the leading end 33a of the delaminated part 33 in the panel provided with the arrester 5 to the energy release rate G at the leading end 33a of the delaminated part 33 in the panel not provided with the arrester 5.

Figure 10:
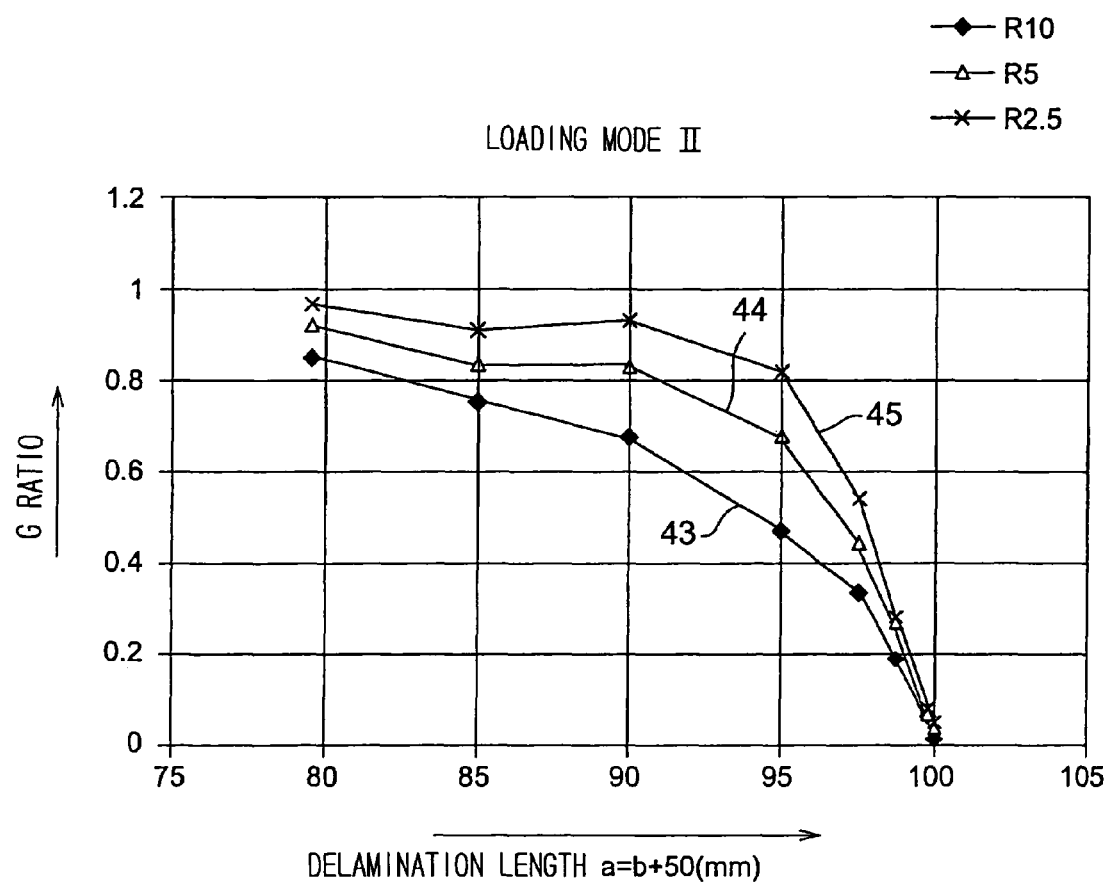
FIG. 10 is a graph showing the variation of G value ratio with delamination length a (=b+50) when the analytical model 30 is loaded in the loading mode II.

FIG. 10 is a graph showing the variation of G ratio with delamination length a (=b+50) for panels respectively provided with arresters 5 respectively having radii R of 10 mm, 5 mm and 2.5 mm when the panels were loaded in the loading mode II. Each of the arresters 5 had a base made from a carbon-fiber-reinforced unidirectional composite material. In FIG. 10, energy release rate G is measured on the vertical axis and delamination length a is measured on the horizontal axis. In FIG. 10, a curve 43 with solid rhombuses is for the arrester 5 having a radius R of 10 mm, a curve 44 with blank triangles is for the arrester 5 having a radius R of 5 mm and a curve 44 with crosses is for the arrester 5 having a radius R of 2.5 mm. In FIG. 10, b is the distance between the part Ps21 near the first end 31 and the leading end 33a of the delaminated part 33.

The delamination length a was changed to change the distance between the leading end 33a of the delaminated part 33 and the arrester and the G ratios were determined for different positions of the leading end 33a of the delaminated part 33 as shown in FIGS. 9 and 10. As obvious from FIGS. 9 and 10, the G ratio approaches zero as the leading end 33a of the delaminated part 33 approaches the arrester 5 in both the loading mode I and the loading mode II. Such a tendency indicates that the energy release rate G decreases sharply with the decrease of the distance between the leading end 33a of the delaminated part 33 and the arrester 5. Thus it was assured that the energy release rate G decreases as the leading end 33a of the delaminated part 33 approaches the arrester 5 and the arrester 5 is effective in preventing the development of delamination. All the arresters 5 respectively having a radius R of 10 mm, a radius R of 5 mm and a radius R of 2.5 mm were effective in preventing the development of delamination. Thus it was assured that the arrester is capable of preventing the development of delamination regardless of the radius of its cross section.

Figure 11:
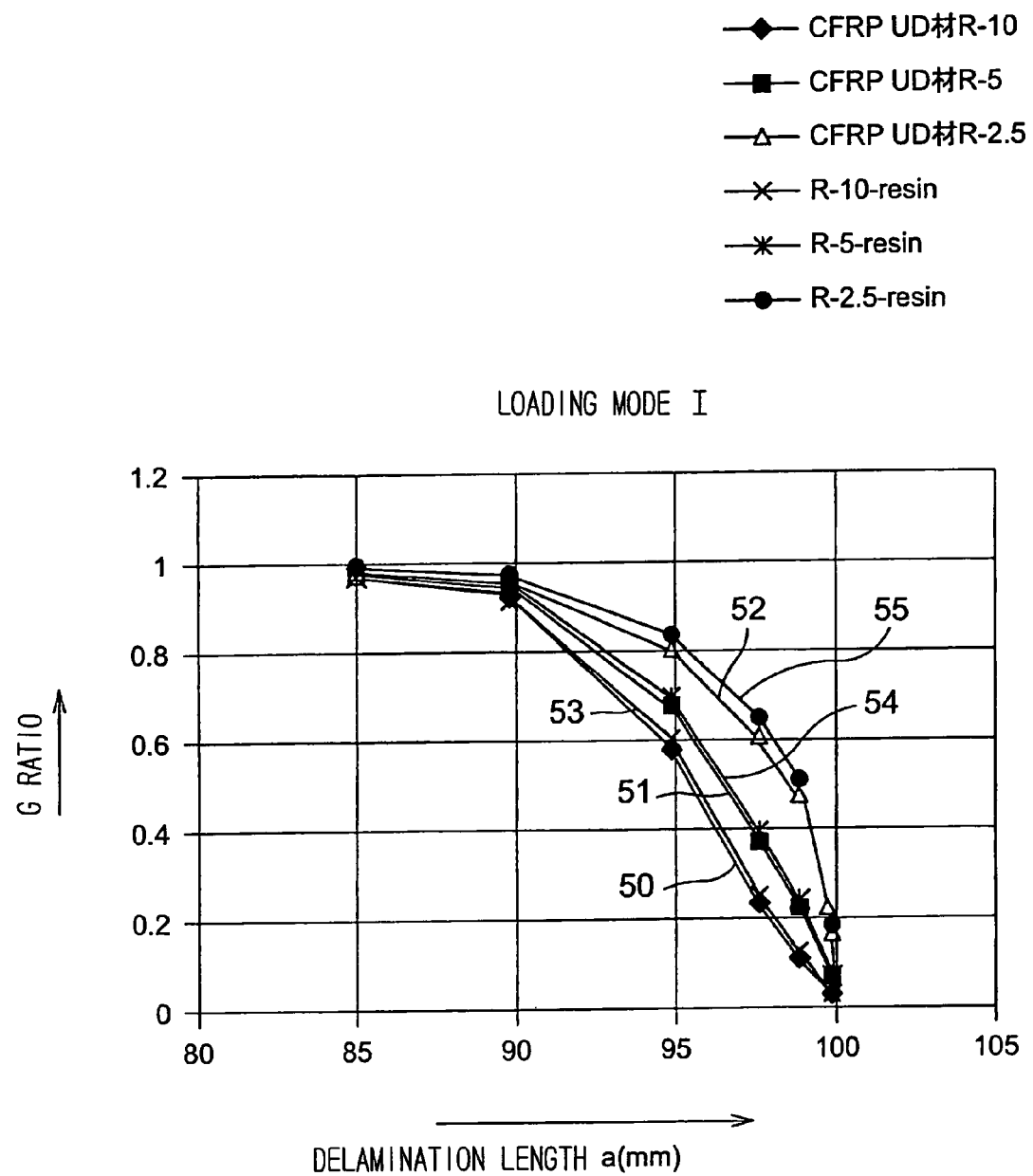
FIG. 11 is a graph showing the variation of G value ratio with delamination length a when the analytical model 30 is loaded in the loading mode I.

FIG. 11 is a graph showing the variation of G ratio with delamination length a when panels provided respectively with arresters 5 having a base of a carbon fiber-reinforced unidirectional composite material and those provided respectively with arresters 5 of a synthetic resin not containing reinforcing fibers were loaded in the loading mode I, in which G ratio is measured on the vertical axis and the delamination length a is measured on the horizontal axis. In FIG. 11, a curve 50 with solid rhombuses ♦, a curve 51 with solid squares ■ and a curve 52 with blank triangles Δ are for arresters 5 of the composite material respectively having cross sections respectively having radii R of 10 mm, 5 mm and 2.5 mm, and a curve 53 with crosses X, a curve 54 with asterisks ✳ and a curve 55 with solid circles ● are for arresters 5 of the synthetic resin respectively having cross sections respectively having radii R of 10 mm, 5 mm and 2.5 mm.

Figure 12:
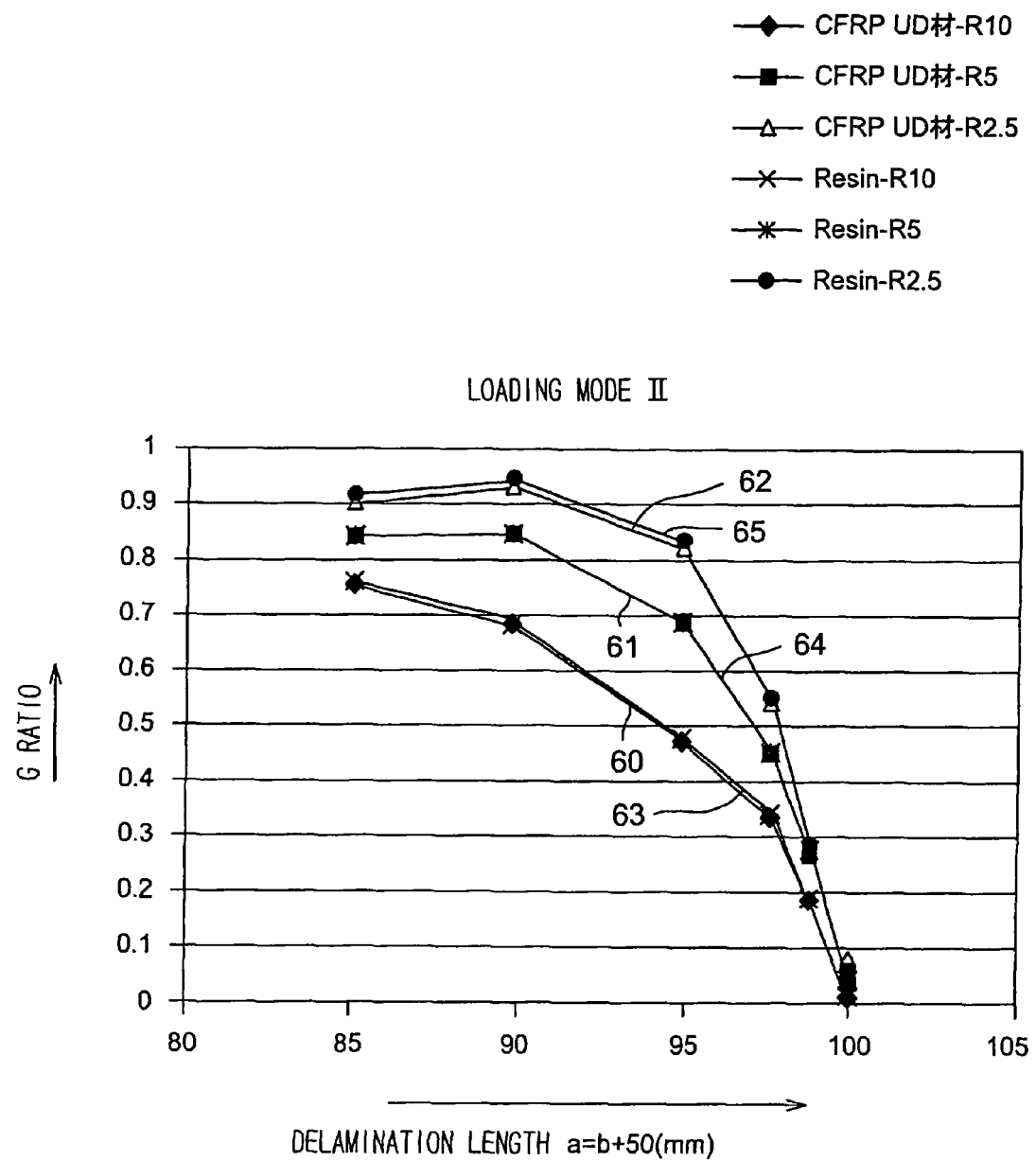
FIG. 12 is a graph showing the variation of G value ratio with delamination length a when the analytical model 30 is loaded in the loading mode II.

FIG. 12 is a graph showing the variation of G ratio with delamination length a when panels provided respectively with arresters 5 having a base of a carbon fiber-reinforced unidirectional composite material and those provided respectively with arresters 5 of a synthetic resin not containing reinforcing fibers were loaded in the loading mode II, in which G ratio is measured on the vertical axis and the delamination length a is measured on the horizontal axis. In FIG. 12, a curve 60 with solid rhombuses ♦, a curve 61 with solid squares ■ and a curve 62 with blank triangles Δ are for arresters 5 of the composite material respectively having cross sections respectively having radii R of 10 mm, 5 mm and 2.5 mm, and a curve 63 with crosses X, a curve 64 with asterisks ✳ and a curve 65 with solid circles ● are for arresters 5 of the synthetic resin respectively having cross sections respectively having radii R of 10 mm, 5 mm and 2.5 mm.

The delamination length a was changed to change the distance between the leading end 33a of the delaminated part 33 and the arrester and the G ratios were determined for different positions of the leading end 33a of the delaminated part 33 as shown in FIGS. 11 and 12. As obvious from FIGS. 11 and 12, the material of the arrester 5 did not have significant effect on the reduction of the energy release rate G at the leading end 33a of the delaminated part 33 in both the loading modes I and II and the effects of the arresters 5 of the composite material and those of the synthetic resin were at substantially the same level. Thus it was assured that even the arresters 5 of the synthetic resin inexpensive as compared with the composite material could exercise a satisfactory effect on the reduction of the energy release rate G at the leading end 33a of the delaminated part 33.

Figure 13:
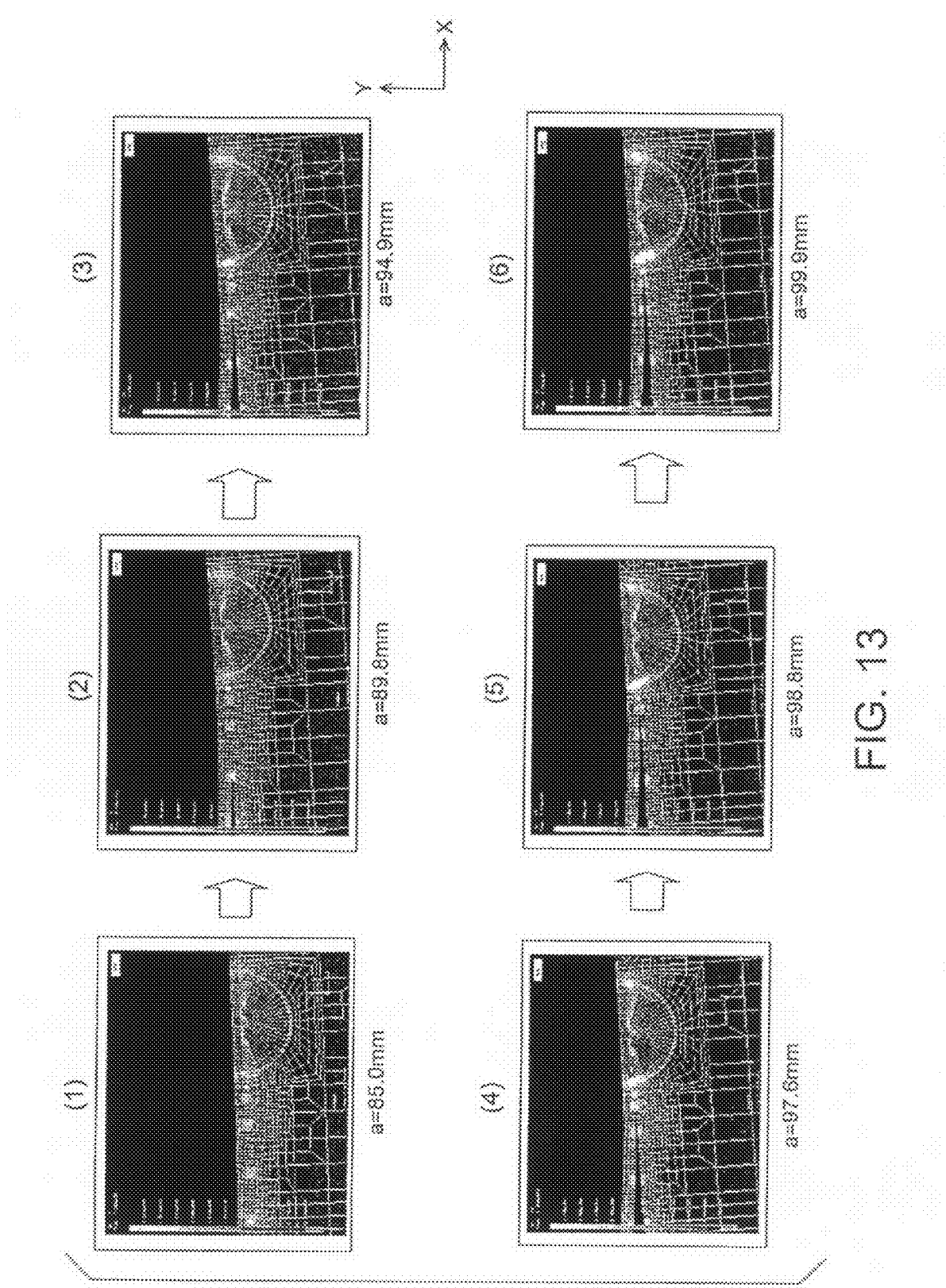
FIG. 13 is a graph showing stress distributions when the analytical model 30 is loaded in the loading mode I.

FIGS. 13(1) to 13(6) are graphs showing stress distributions in panels loaded in the loading mode I and having delaminated parts respectively having delamination lengths a of 85.0 mm, 89.8 mm, 94.9 mm, 97.6 mm, 98.9 mm and 99.99 mm. Parts with higher lightness, namely, whitish parts, in FIG. 13 represent parts in the panel in which higher stress was induced, and parts with lower lightness, namely, blackish parts, in FIG. 13 represent parts in the panel in which a lower stress was induced.

Figure 14:
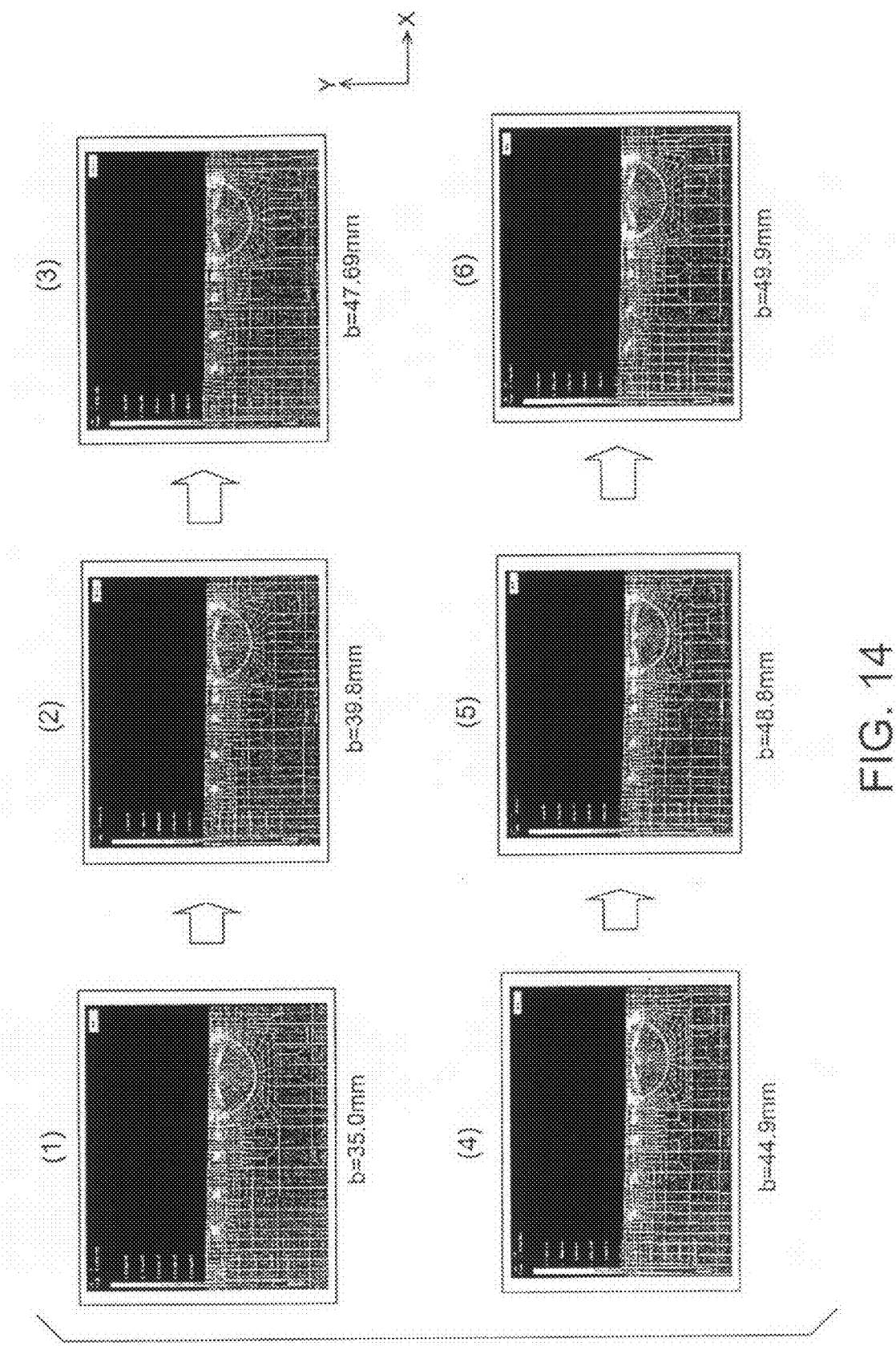
FIG. 14 is a graph showing stress distribution when the analytical mode is loaded in the loading mode II.

FIGS. 14(1) to 14(6) are graphs showing stress distributions in panels loaded in the loading mode II and having the supported parts Ps21 at distances b of 35.0 mm, 39.8 mm, 44.9 mm, 47.6 mm, 48.9 mm and 49.99 mm from the leading end 33a of the delaminated part 33, respectively. Parts with higher lightness, namely, whitish parts, in FIG. 14 represent parts in the panel in which higher stress was induced, and parts with lower lightness, namely, blackish parts, in FIG. 14 represent parts in the panel in which a lower stress was induced.

In FIG. 6, the distance L1 between the first end 31 with respect to the first direction X and the end of the arrester 5 on the side of the first end with respect to the first direction X is 100 mm. The leading end 33a of the delaminated part 33 is at the right end of a range of the delamination length a. As shown in FIGS. 13(1) to 13(6), the increase of the delamination lengths a of the delaminated part in the order of FIGS. 13(1) to 13(6) signifies that the distances of the leading ends 33a of the delaminated part 33 from the end of the arrester 5 on the side of the first end 31 with respect to the first direction X shown in FIGS. 13(1) to 13(6) decrease in the order of FIGS. 13(1) to 13(6). For example, the delamination length a=85.0 mm and hence the distance between the leading end 33a of the delaminated part 33 and the end of the arrester 5 on the side of the first end 31 with respect to the first direction X is 15.0 mm in FIG. 13(1), while the delamination length a=99.9 mm and hence the distance between the leading end 33a of the delaminated part 33 and the end of the arrester 5 on the side of the first end 31 with respect to the first direction X is 0.1 mm in FIG. 13(6). As shown in FIGS. 14(1) to 14(6), the increase of the delamination lengths a of the delaminated part in the order of FIGS. 14(1) to 14(6) signifies that the distances of the leading ends 33a of the delaminated part 33 from the end of the arrester 5 on the side of the first end 31 with respect to the first direction X shown in FIGS. 14(1) to 14(6) decrease in the order of FIGS. 14(1) to 14(6).

In each of FIGS. 13 and 14, a part demarcated by a semicircle and radial segments corresponds to the arrester 5, a part extending above a straight line including a segment corresponding to the chord of the semicircle corresponds to the surface plate 4a, and a part extending below the straight line corresponds to the core 3.

As obvious from FIGS. 13 and 14, points having higher lightness and distributed in the vicinity of the arrester 5 increase and the lightness of a part corresponding to the leading end 33a of the delaminated part 33 decreases as the leading end 33a of the delaminated part 33 approaches the arrester 5, which signifies that a region in which high stress is induced shifts from the leading end 33a of the delaminated part 33 toward the arrester 5 as the leading end 33a of the delaminated part 33 approaches the arrester 5.

As obvious from FIGS. 13 and 14, whereas high stresses are induced in a part around the leading end 33a of the delaminated part 33 and a boundary part between the core 3 and the surface plate 4a while the leading end 33a of the delaminated part 33 is at a comparatively long distance from the arrester 5, the stress induced in the part around the leading end 33a of the delaminated part 33 decreases and stress induced in the arrester 5 increases as the leading end 33a of the delaminated part 33 approaches the arrester 5, which signifies that the effect of the external force on the arrester increases as the leading end 33a of the delaminated part 33 approaches the arrester 5. It is obvious from those stress distributions that the energy release rate G decreases as the leading end 33a of the delaminated part 33 approaches the arrester 5 because the external force F is born by the arrester 5.

As obvious from FIGS. 13 and 14, part of energy causing the development of the delaminated part 33 and distributed to the arrester 5 increases as the leading end 33a of the delaminated part 33 approaches the arrester 5, and the development of the delaminated part 33 beyond the arrester 5 is prevented by the arrester 5.

Figure 15:
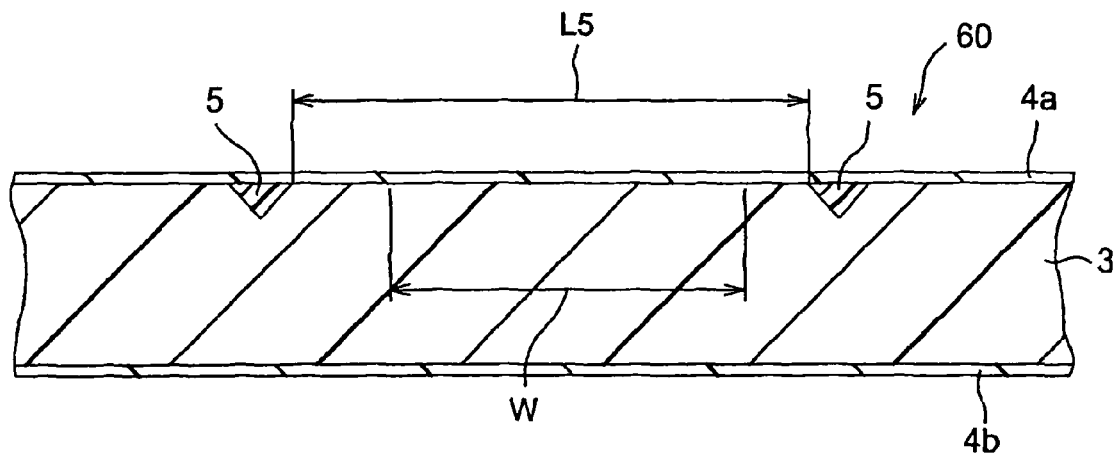
FIG. 15 is a sectional view of a specimen 60 for testing the delamination development preventing effect of the arrester 5.

FIG. 15 is a sectional view of a specimen 60 for testing the delamination development preventing effect of the arrester. The inventors of the present invention conducted a test to evaluated the delamination development preventing effect of the arrester 5 using the specimen 60 shown in FIG. 15 and simulating the panel 2 in addition to the loading tests using the analytical model 30 shown in FIGS. 6 to 14. Parts of the specimen 60 corresponding to those of the panel 2 are designated by the same reference characters.

The specimen 60 has a core 3 and surface plates 4a and 4b attached to the opposite surfaces with respect to the thickness direction of the core 3, respectively. Two arresters 5 are protruded from the inner surface of the surface panel 4a in the thickness direction toward the core 3. The arresters 5 extend perpendicularly to the paper into the paper. The arresters 5 are extended parallel to each other and are laterally spaced apart from each other as viewed in FIG. 15. In this specimen 60, each of the arresters 5 has a triangular cross section. A part of the arrester corresponding to the base of the triangular cross section is contiguous with the surface plates 4a. The interval L5 between the arresters 5 is 70 mm. Basically, three specimens 60 as shown in FIG. 15 were tested. An impact was applied to a central part of each specimen 60 to form a delaminated part and then, a compressive load and a tensile load were applied repeatedly in directions perpendicular to the paper and the development of the delamination was visually observed. The width W of a delaminated part was determined through the measurement of a part of the surface plate 4a deformed due to delamination.

A first specimen 60, namely, specimen X-1, includes arresters 5 having a base of a carbon-fiber-reinforced unidirectional material. A compressive load (compressive force) of 25.5 kN and a tensile load (tensile force) of 25.5 kN were applied repeatedly to the specimen X-1. A second specimen 60, namely, specimen X-3, includes arresters 5 having a base of a carbon-fiber-reinforced unidirectional material. A compressive load (compressive force) of 18.6 kN and a tensile load (tensile force) of 18.6 kN were applied repeatedly to the specimen X-3. A third specimen 60, namely, specimen X-4, includes arresters 5 having a base of a glass-fiber-reinforced unidirectional material. A compressive load (compressive force) of 18.6 kN and a tensile load (tensile force) of 18.6 kN were applied repeatedly to the specimen X-4.

Table 1 shows the progress of delamination in the specimens 60.

TABLE 1

| Specimen No. | Material of the arrester | Load (kN) | R | Number of loading (cycles) | Progress of delamination development |
|---|---|---|---|---|---|
| A-1 | Unidirectional CFRP | 25.5 | −1.0 | $3.0 \times 10^5$ | Stopped at 40 mm |
| A-3 | Unidirectional CFRP | 18.6 | " | $1.0 \times 10^6$ | Stopped at 25 mm |
| A-4 | Unidirectional GFRP | 18.6 | " | $1.0 \times 10^6$ | Stopped at 45 mm |

In Table 1, "R" indicates the ratio of tensile load to compressive load.

Figure 16:
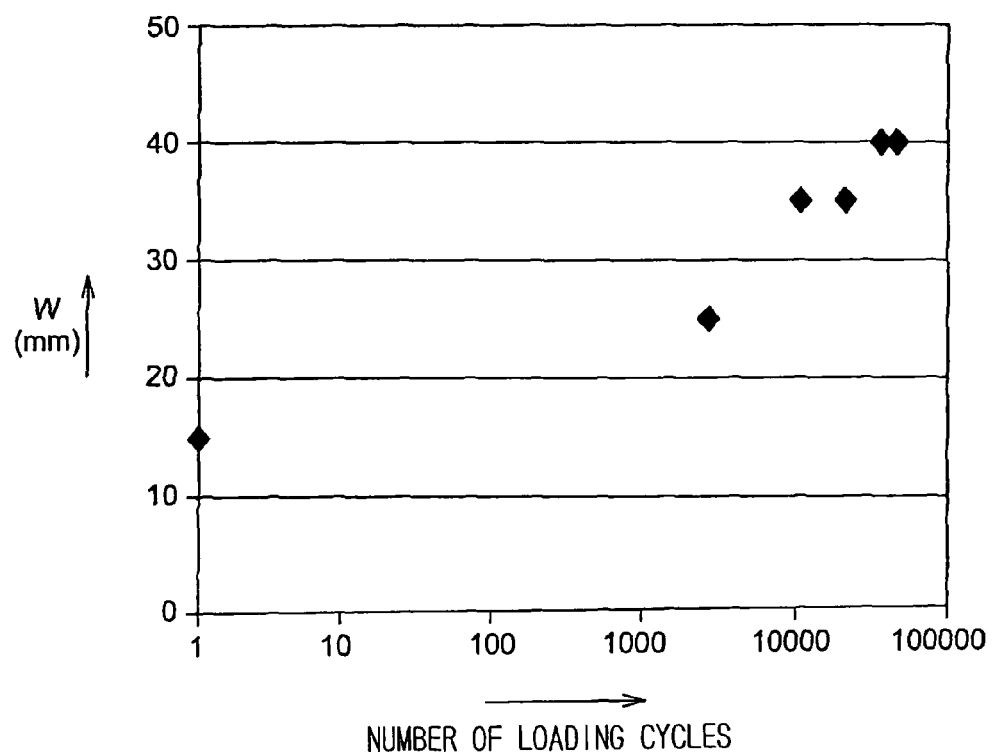
FIG. 16 is a graph showing the variation of the width W of a delaminated part in a first specimen 60, namely, a specimen X−1, with the number of loading cycles.
Figure 17:
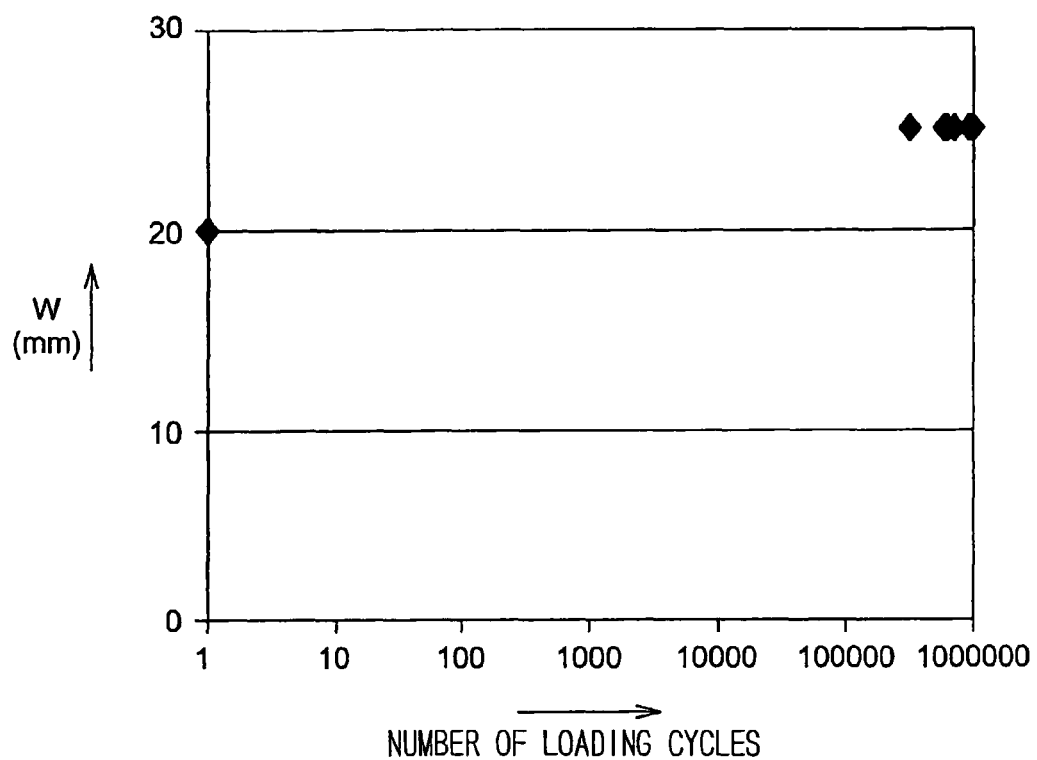
FIG. 17 is a graph showing the variation of the width W of a delaminated part in a second specimen 60, namely, a specimen X−3 with the number of loading cycles.
Figure 18:
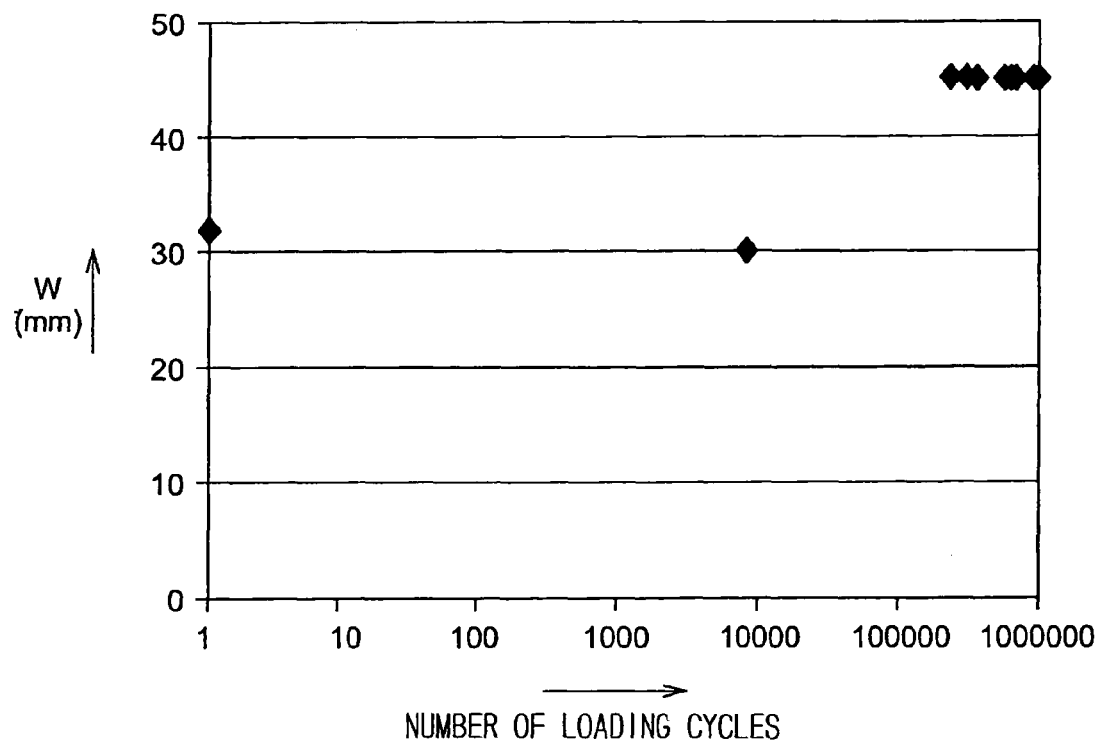
FIG. 18 is a graph showing the variation of the width W of a delaminated part in a first specimen 60, namely, a specimen X−4 with the number of loading cycles.

FIG. 16 is a graph showing the variation of the width W of a delaminated part in the first specimen 60 (specimen X-1) with the number of loading cycles. FIG. 17 is a graph showing the variation of the width W of a delaminated part in the second specimen 60 (specimen X-2) with the number of loading cycles. FIG. 18 is a graph showing the variation of the width W of a delaminated part in the third specimen 60 (specimen X-4) with the number of loading cycles. In FIGS. 16 to 18, the number of loading cycle is measured on the horizontal axis and the width W of the delaminated part is measured on the vertical axis. One loading cycle includes the application of the compressive load to the specimen and the subsequent application of the tensile load to the specimen.

As obvious from Table 1 and FIGS. 16 to 18, the delaminated part cannot develop beyond the arrester 5 even if the compressive load and the tensile load are applied repeatedly to the specimen 60. The test that performs repeated loading proved that the arrester 5 can prevent the development of delamination.

In the delamination development preventable structure 1 in this embodiment, the arresters 5 are protruded inward from the inner surfaces of the surface plates 4a and 4b. The development of a delaminated part formed by the separation of a part of the surface plate 4a from the core 3 and that of a delaminated part formed by the separation of a part of the surface plate 4b from the core 3 beyond the arresters 5 can be prevented. Thus delamination can be limited to a narrow local region and the spread of the delaminated part over the entire panel 2 can be prevented. Since the arresters 5 of the delamination development preventable structure 1 in this embodiment are formed in the shape of a grid, the development of delamination can be limited to the smallest possible region. Thus the development of delamination in the sandwich panel 2 can be prevented and the durability of the sandwich panel 2 can be enhanced.

The arresters 5 sink by a depth into the core 3 in the thickness directions and do not protrude through the core in the thickness directions. The core 3, the surface plates 4a and 4b and the arresters 5 can be united together such that the arresters 5 sink in a depth into the core 3 by placing the arresters 5 between the core 3 and the surface plate 4a and between the core 3 and the surface plate 4b to form a layered structure and compressing the layered structure with respect to the thickness directions Y under heat by a method similar to a known panel fabricating method of fabricating a panel not provided with arresters. Thus the delamination development preventable structure 1 including the arresters 5 can be easily fabricated without requiring troublesome work. The grooves 13 formed in the surfaces of the core 3 to receive the arresters 5 can prevent the unnecessary compression of the core 3 and can prevent the defective bonding of parts of the surface plates 4a and 4b around the arresters 5 to the core 3.

The arresters 5 have a semicircular cross section and have unbent curved surfaces contiguous with the core 3 and not having any bent parts (ridges). Therefore, any bends that cause stress concentration are not formed in the core 3. Thus the arresters 5 will not exert a detrimental effect on the core 3.

Although each of the arresters 5 included in the specimen 60 shown in FIG. 15 has a triangular cross section, it is preferable to round the sharp edge of the arrester 5 to form the surface of the arrester 5 in an unbent curved surface consisting of flat parts and a curved part.

When the panel is provided with the arresters employed in this embodiment, it is possible to determine whether or not any delaminated parts are formed between the core 3 and the surface plate 4a and between the core 3 and the surface plate 4b by a single cycle of an ultrasonic inspection using an ultrasonic detector that sends ultrasonic waves in the thickness directions through the surface panels 4a and 4b. The ultrasonic inspection is an easy inspection method, as compared with an inspection method using x-rays, in respect of equipment and environment. The ultrasonic inspection can be easily accomplished. If the panel is provided with arresters having an I-shaped cross section, the inspection of a middle part, with respect to the thickness, of the core 3 by the ultrasonic inspection is difficult. In such a case, inspection by another inspection method, such as an x-ray inspection, is needed. When the arresters 5 are, as mentioned above, elongate ribs of a filler extending along the surface plates 4a and 4b, delaminated parts in the panel can be easily detected by a nondestructive inspection.

Figure 19:
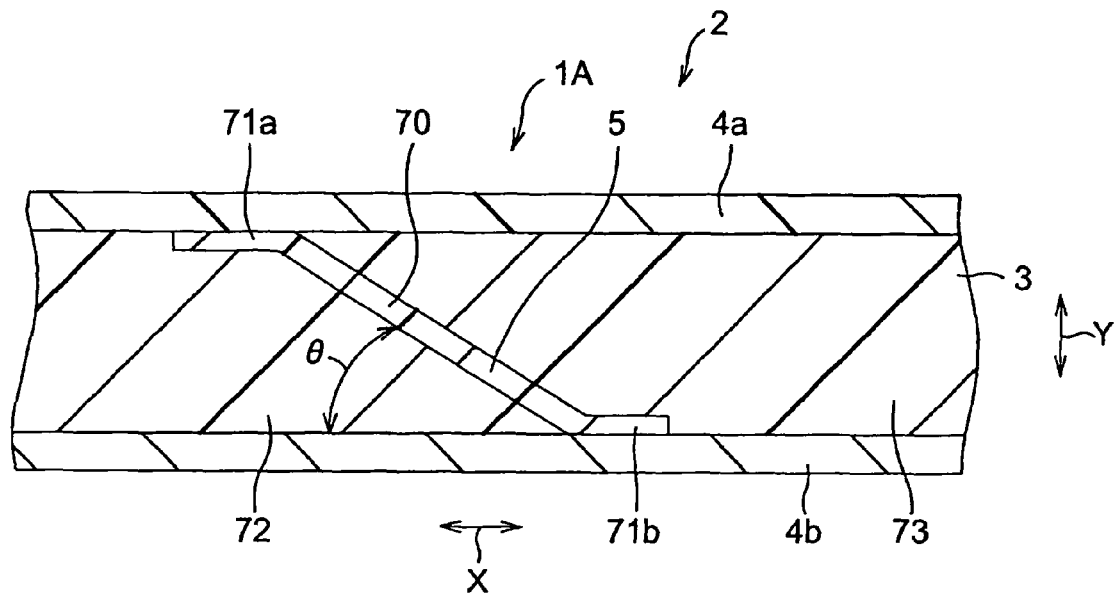
FIG. 19 is a sectional view of a delamination development preventable structure 1A in a second embodiment according to the present invention.

FIG. 19 is a sectional view of a delamination development preventable structure 1A in a second embodiment according to the present invention. The delamination development preventable structure 1A shown in FIG. 19 is similar to the delamination development preventable structure 1 in the first embodiment described in connection with FIGS. 1 to 18. In FIG. 19 parts like or corresponding to those of the delamination development preventable structure 1 are designated by the same reference characters and the description thereof will be omitted. In the delamination development preventable structure 1A shown in FIG. 19, an arrester 5 extends between surface plates 4a and 4b. The arrester 5 is made from, for example, a composite material like that of the surface plates 4a and 4b.

The arrester 5 included in this embodiment is a plate extending in the second direction Z (in a direction perpendicular to the paper as viewed in FIG. 19). The arrester 5 has a base part 70 obliquely extending between the surface plates 4a and 4b in a direction inclined to a direction parallel to the thickness of a panel 2 and to the surface panels 4a and 4b, and joining parts 71a and 71b extending from the opposite ends of the base part 70 at an obtuse angle to the base part 70 so as to extend along the surface plates 4a and 4b, respectively. The base part 70 extends obliquely upward from the surface plate 4b toward the surface plate 4a so as to incline in the first direction X (to the left as viewed in FIG. 19). The joining part 71a extends from one of the ends of the base part 70 with respect to the thickness direction Y in one of the opposite first directions X and the joining part 71b extends from the other end of the base part 70 in the other first direction X. Equal acute angles θ between the base part 70 and the surface plate 4a and between the base part 70 and the surface plate 4b are between about 30° and about 45°. The base part 70 of the arrester 5 extends obliquely through a core 3. The joining parts 71a and 71b are fixedly joined to the surface plates 4a and 4b, respectively.

Figure 20:
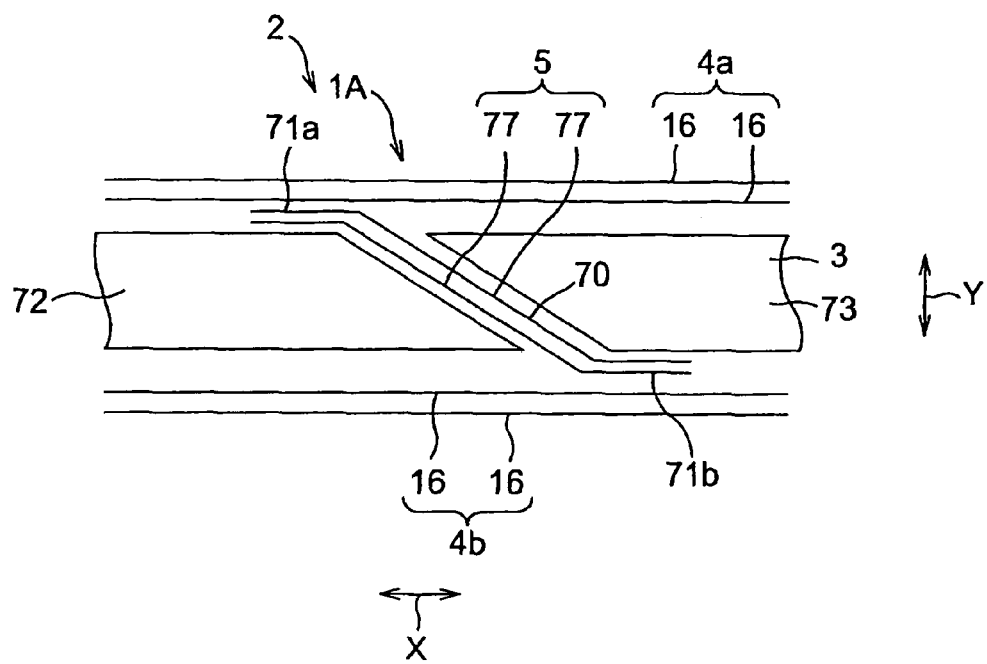
FIG. 20 is an exploded sectional view of the delamination development preventable structure 1A shown in FIG. 19.

FIG. 20 is an exploded sectional view of the delamination development preventable structure 1A shown in FIG. 19. FIG. 20 shows the layered construction of the delamination development preventable structure 1A. The core 3 is divided into fractional cores 72 and 73 by a dividing plane inclined to the thickness direction Y so as to incline in one of the opposite first directions X. The base part 70 of the arrester 5 is held between the fractional cores 72 and 73. The joining part 71a extends along one of the surfaces of the fractional core 72 on the side of one of the thickness directions, and the joining part 71b extends along one of the surfaces of the fractional core 73 on the side of the other thickness direction. The surface plates 4a and 4b are joined respectively to the opposite surfaces of the core 3 having the fractional cores 72 and 73 holding the arrester 5 therebetween.

To fabricate such a panel 2, the core 3 is divided into the fractional cores 72 and 73, and a plurality of prepregs 77 produced by processing a fiber-reinforced composite material for forming the arrester 5 are placed in plies between the fractional cores 72 and 73. The prepregs 77 are compressed in the first directions X. End parts of the prepregs 77 extending outside in opposite directions, respectively, from the space between the fractional cores 72 and 73 are extended along the outer surfaces of the fractional cores 72 and 73, respectively. Prepregs 16 produced by processing a fiber-reinforced composite material for forming the surface plates 4a and 4b are superposed in a plurality of plies on the opposite surfaces of the core 3 to build a composite structure. The composite structure is compressed in the thickness directions Y under heat. Consequently, the prepregs 16 and 77 are solidified and are bonded to the core 3. Thus the core 3, the surface plates 4a and 4b, and the arrester 5 are united together to complete the panel 2. In FIG. 20, the respective thicknesses of the prepregs 16 and 77 are neglected to facilitate understanding.

The effects of the delamination development preventable structure 1A in this embodiment excluding are the same as those of the delamination development preventable structure 1 shown in FIGS. 1 to 18 excluding the effect of the arresters 5 sinking in a depth into the core 3. The surface plates 4a and 4b can be connected by the arrester 5 extended through the core 3 in the thickness direction between the surface plates 4a and 4b. The arrester 5 thus disposed can prevent the development of delamination and can reinforce the sandwich panel 2 to enhance the durability of the sandwich panel 2. Since the arrester 5 is extended between the surface plates 4a and 4b with its base part 70 inclined to the thickness direction Y, the core 3, the surface plates 4a and 4b and the arrester 5 can be united together by a uniting process that compresses the layered structure in the thickness directions Y under heat similarly to a known uniting process.

Figure 21:
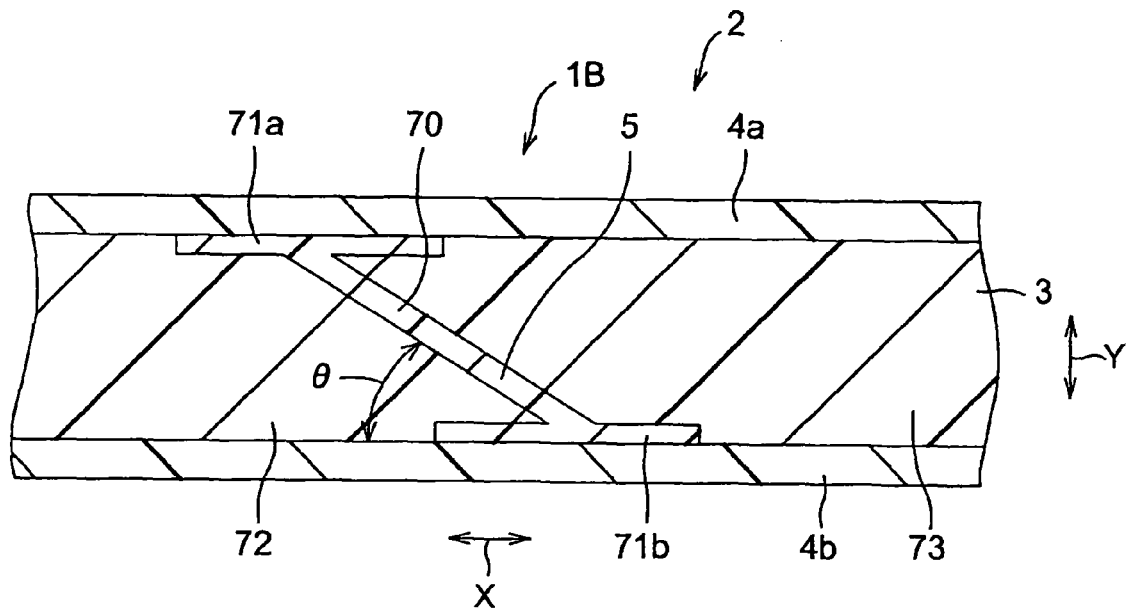
FIG. 21 is a sectional view of a delamination development preventable structure 1B in a third embodiment according to the present invention.

FIG. 21 is a sectional view of a delamination development preventable structure 1B in a third embodiment according to the present invention. The delamination development preventable structure 1B shown in FIG. 21 is similar to the delamination development preventable structure 1A in the second embodiment described in connection with FIGS. 19 and 20. In FIG. 21, parts like or corresponding to those of the delamination development preventable structure 1A are designated by the same reference characters and the description thereof will be omitted. In the delamination development preventable structure 1B shown in FIG. 21, an arrester 5 extends between surface plates 4a and 4b. The arrester 5 is made from, for example, a composite material like that of the surface plates 4a and 4b.

The arrester 5 included in this embodiment is a plate extending in the second direction Z (in a direction perpendicular to the paper as viewed in FIG. 21). The arrester 5 has a base part 70 obliquely extending between the surface plates 4a and 4b in a direction inclined to a direction parallel to the thickness of a panel 2 and to the surface panels 4a and 4b, and joining parts 71a and 71b extending from the opposite ends of the base part 70, respectively, in the first directions X so as to extend along the surface plates 4a and 4b, respectively. The base part 70 extends obliquely upward from the surface plate 4b toward the surface plate 4a so as to incline in the first direction X (to the left as viewed in FIG. 21). The joining part 71a extends from one of the ends of the base part 70 with respect to the thickness direction Y in the opposite first directions X and the joining part 71b extends from the other end of the base part 70 in the opposite first directions X. Equal acute angles θ between the base part 70 and the surface plate 4a and between the base part 70 and the surface plate 4b are between about 30° and about 45°. The base part 70 of the arrester 5 extends obliquely through a core 3. The joining parts 71a and 71b are fixedly joined to the surface plates 4a and 4b, respectively.

Figure 22:
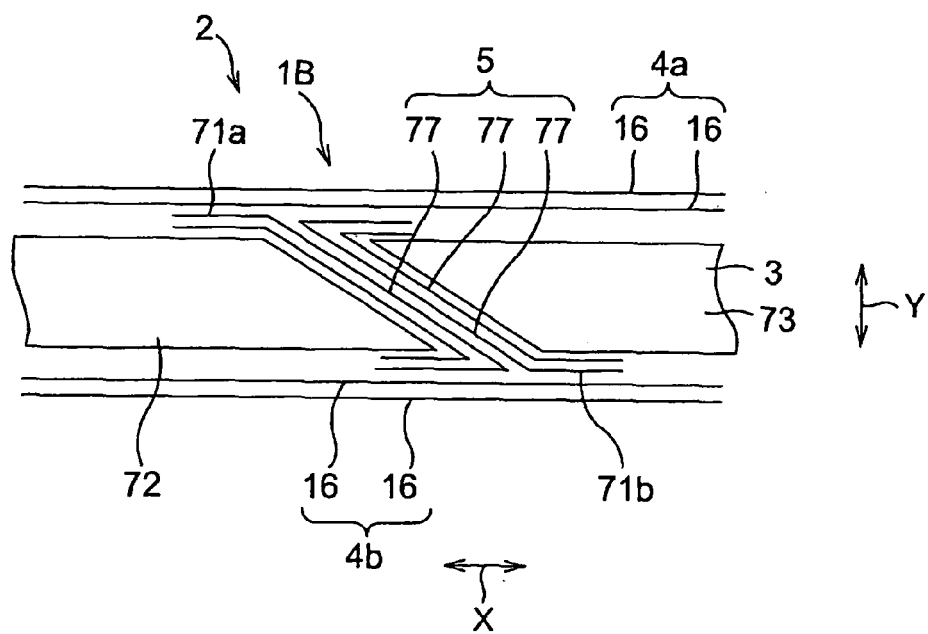
FIG. 22 is an exploded sectional view of the delamination development preventable structure 1B shown in FIG. 21.

FIG. 22 is an exploded sectional view of the delamination development preventable structure 1B shown in FIG. 21. FIG. 22 shows the layered construction of the delamination development preventable structure 1B. The core 3 is divided into fractional cores 72 and 73 by a dividing plane inclined to the thickness direction Y so as to incline in one of the opposite first directions X. The base part 70 of the arrester 5 is held between the fractional cores 72 and 73. The joining part 71a extends along one of the surfaces of each of the fractional cores 72 and 73 on the side of one of the thickness directions, and the joining part 71b extends along the other surface of each of the fractional cores 72 and 73 on the side of the other thickness direction. The surface plates 4a and 4b are joined respectively to the opposite surfaces of the core 3 having the fractional cores 72 and 73 holding the arrester 5 therebetween.

To fabricate such a panel 2, the core 3 is divided into the fractional cores 72 and 73, and a plurality of prepregs 77 produced by processing a fiber-reinforced composite material for forming the arrester 5 are placed in plies between the fractional cores 72 and 73. The prepregs 77 are compressed in the first directions X. Each of the end parts of the prepregs 77 extending outside in opposite directions, respectively, from the space between the fractional cores 72 and 73 is divided into two substantially equal end parts. The prepregs 77 of one of the two equal parts on the side of the fractional core 72 are extended along the outer surface of the fractional core 72 with respect to the thickness direction, and the prepregs of the other end part on the side of the fractional core 73 are extended along the outer surface of the fractional cord-reinforced 73 with respect to the thickness direction. Prepregs 16 produced by processing a fiber-reinforced composite material for forming the surface plates 4a and 4b are superposed in a plurality of plies on the opposite surfaces of the core 3 to build a composite structure. The composite structure is compressed in the thickness directions Y under heat. Consequently, the prepregs 16 and 77 are solidified and are bonded to the core 3. Thus the core 3, the surface plates 4a and 4b, and the arrester 5 are united together to complete the panel 2. In FIG. 22, the respective thicknesses of the prepregs 16 and 77 are neglected to facilitate understanding.

The delamination development preventable structure 1B in this embodiment has effects similar to those of the delamination development preventable structure 1A shown in FIGS. 19 and 20.

Figure 23:
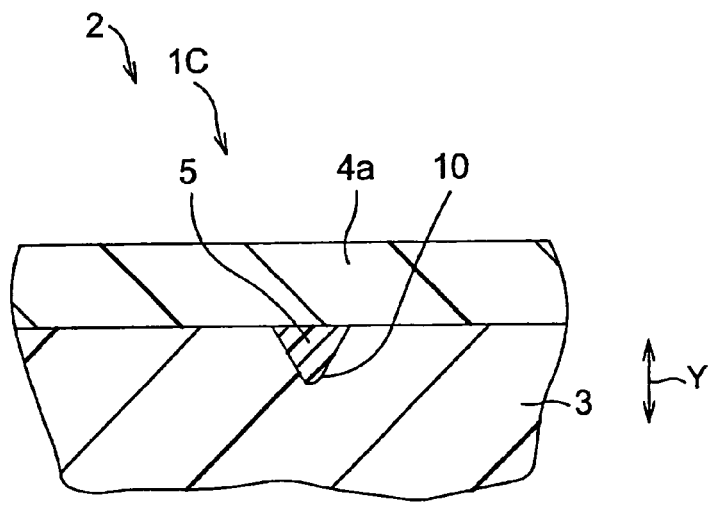
FIG. 23 is a sectional view of a delamination development preventable structure 1C in a fourth embodiment according to the present invention.

FIG. 23 is a sectional view of a delamination development preventable structure 1C in a fourth embodiment according to the present invention. The delamination development preventable structure 1C shown in FIG. 23 is similar to the delamination development preventable structure 1 in the first embodiment described in connection with FIGS. 1 to 18. In FIG. 23, parts like or corresponding to those of the delamination development preventable structure 1 are designated by the same reference characters and the description thereof will be omitted. In the delamination development preventable structure 1C shown in FIG. 23, each arresters 6 and 7 has a substantially triangular cross section. Parts of the arresters corresponding to the base of the substantially triangular cross section are contiguous with surface plates 4a and 4b, respectively. The edge of the arrester opposite the base of the substantially triangular cross section is rounded in the shape of a circular arc. Thus the surface of the arrester 5 is an unbent surface consisting of flat parts and a curved part.

The delamination development preventable structure 1C in this embodiment has effects similar to those of the delamination development preventable structure 1 shown in FIGS. 1 to 18.

Figure 24:
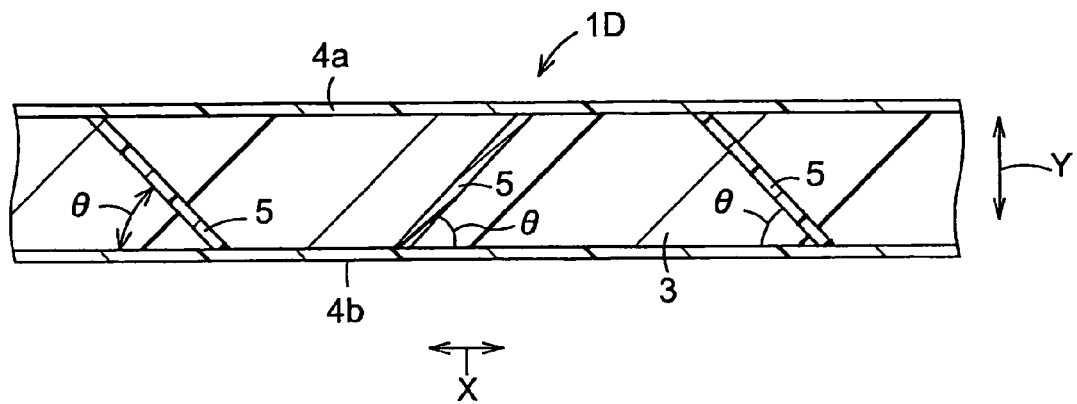
FIG. 24 is a sectional view of a delamination development preventable structure 1D in a fifth embodiment according to the present invention.

FIG. 24 is a sectional view of a delamination development preventable structure 1D in a fifth embodiment according to the present invention. The delamination development preventable structure 1D shown in FIG. 24 is similar to the delamination development preventable structures 1A and 1B in the second and the third embodiment described in connection with FIGS. 19 to 22. In FIG. 24, parts like or corresponding to those of the delamination development preventable structures 1A and 1B are designated by the same reference characters and the description thereof will be omitted. The delamination development preventable structure 1D shown in FIG. 24 is provided with arresters 5 like those shown in FIGS. 19 and 20 or those shown in FIGS. 21 and 22. The arresters 5 are arranged at intervals in the first direction X. The arresters 5 adjacent to each other with respect to the first direction X are inclined in opposite directions, respectively, such that those arresters 5 are symmetrical with respect to the first direction X. Each arrester 5 has a base part 70. Equal acute angles θ between the base part 70 and the surface plate 4a and between the base part 70 and the surface plate 4b are between about 30° and about 45°. The base part 70 of the arrester 5 extends obliquely through a core 3. The joining parts 71a and 71b are fixedly joined to the surface plates 4a and 4b, respectively.

The delamination development preventable structure 1D in this embodiment has effects similar to those of the delamination development preventable structures 1A and 1B shown in FIGS. 19 to 22. Box-shaped structures may be built by the arrester 5 and the surface plates 4a and 4b by placing a plurality of arresters 5 having the shape of a plate between the surface plates 4a and 4b so as to extend in the second direction Z (a direction perpendicular to the paper in FIG. 24). The box-shaped structures can enhance strength under load acting in the direction in which the arresters 5 are extended, namely, the second direction Z (a direction perpendicular to the paper in FIG. 24), particularly, under compressive load.

Figure 25:
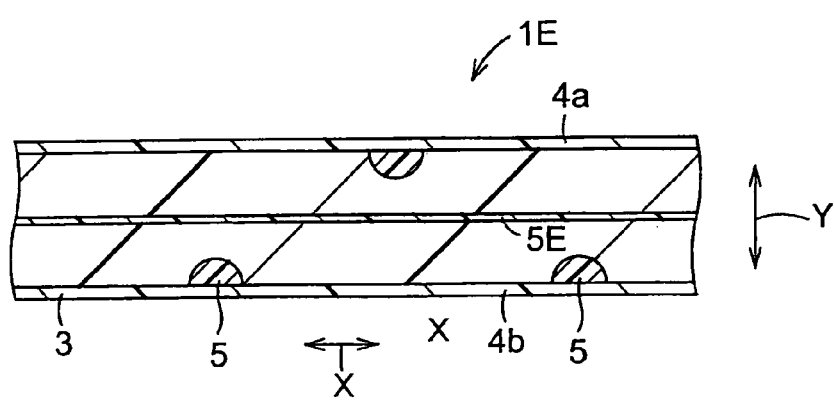
FIG. 25 is a sectional view of a delamination development preventable structure 1E in a sixth embodiment according to the present invention.

FIG. 25 is a sectional view of a delamination development preventable structure 1E in a sixth embodiment according to the present invention. The delamination development preventable structure 1E shown in FIG. 25 is similar to the delamination development preventable structure 1 in the first embodiment described in connection with FIGS. 1 to 18. In FIG. 25, parts like or corresponding to those of the delamination development preventable structures 1 are designated by the same reference characters and the description thereof will be omitted. The delamination development preventable structure 1E shown in FIG. 25 is provided with an auxiliary arrester 5E in addition to grid-shaped arresters 5 having fractional arresters 6 and 7 like those shown in FIGS. 1 to 18. The auxiliary arrester 5E prevents the development of a delaminated part between a surface plate 4a and a core 3 and a delaminated part between a surface plate 4b and the core 3 in the thickness directions Y into the core 3.

More concretely, the auxiliary arrester 5E is extended in a plane at a middle part of the core 3 with respect to the thickness direction Y. The term "middle part" does not necessarily signify a part exactly at the middle of the core 3 with respect to the thickness direction Y and signifies any part between the opposite surfaces of the core 3. The auxiliary arrester 5E extends along surface plates 4a and 4b over the entire area of a panel 2. The auxiliary arrester 5E may be made from a composite material like that of the surface plates 4a and 4b or made of a synthetic resin. The delamination development preventable structure 1E may be provided with any number of auxiliary arresters 5E. There are not particular restrictions on the shape, thickness and material of the auxiliary arrester 5E.

The delamination development preventable structure 1E has effects similar to those of the delamination development preventable structure 1 shown in FIGS. 1 to 18. Even if delaminated parts are formed between the core 3 and the surface plate 4a and between the core 3 and the surface plate 4b when the panel 2 is used under certain conditions of use and loading and the delaminated parts develop in cracks into the core 3 in the thickness directions Y, the auxiliary arrester 5E placed in a middle part of the core 3 prevents the development of the cracks beyond the auxiliary arrester 5E. Thus the development of cracks from the surface plates 4a and 4b through the core 3 can be prevented. The delamination development preventable structure 1E provided with the auxiliary arrester 5E can exercise a three-dimensional delamination development preventing effect.

The foregoing embodiments are only examples of the present invention and the present invention is not limited thereto in its practical application. For example, the arrester may have a cross section other than the cross sections mentioned herein, may be made of a material other than those mentioned herein and may be arranged and disposed in an arrangement and disposition other than those mentioned herein. The arresters 5 shown in FIGS. 1 to 18 and 23 have a shape resembling a grid. The arresters 5 shown in FIGS. 19 to 22 have a shape resembling a straight line. For example, the arresters may be arranged in stripes substantially parallel to the first direction X, the arresters may be formed by joining together fractional arresters extending at least three different directions in a plane parallel to the surface plates 4a and 4b at their intersections; that is, arresters may be net-shaped structures having polygonal meshes, such as triangular meshes or may be honeycomb structures.

The use of the panel 2 is not limited to the skin 21 of the airplane 20 and may be applied to forming the airframes of aircraft, other than airplanes, including flying objects capable of flying at high speeds in air. The panel 2 may be applied to forming car bodies of the rolling stock including high-speed railroad coaches of the Shinkansen line. The panel 2 is applicable also to forming structures of ships, oil tanks, blades for wind power generators, structures of vehicles including electric vehicles, solar cars and formula cars, such as Formula One machines, structures of military facilities, and marine structures of machines for deep sea exploration including deep ocean survey vehicles.

The arresters 5 shown in FIGS. 19 to 22 may be extended substantially perpendicularly to the surface plates 4a and 4b; that is, substantially parallel to the thickness direction Y.

The invention claimed is:

1. A delamination development preventable structure for a sandwich panel comprising:
   a core of a foam synthetic resin;
   two surface plates bonded respectively to opposite surfaces of the core with respect to a direction parallel to a thickness of the core; and
   delamination development preventing members protruded inward from the two surface plates so as to sink into the core with respect to directions parallel to the thickness of the core, respectively,
   wherein the delamination development preventing members are sunk into the core with respect to directions parallel to the thickness of the core by a depth not greater than half of the thickness of the core, and
   wherein the delamination development preventing members have a semicircular cross section having a semicircular arc part and a straight line part, the semicircular arc part being positioned in the core and the straight line part being positioned along a respective one of the two surface plates.

2. The delamination development preventable structure for a sandwich panel according to claim 1, wherein the delamination development preventing members are ribs.

3. The delamination development preventable structure for a sandwich panel according to claim 2, wherein the delamination development preventing members are formed in a grid.

4. The delamination development preventable structure for a sandwich panel according to claim 2, wherein the ribs serving as the delamination development preventing members contiguous with one of the two surface plates and the ribs contiguous with the other of the two surface plates are displaced relative to each other.

5. The delamination development preventable structure for a sandwich panel according to claim 1, wherein the delamination development preventing members are extended between the two surface plates.

6. The delamination development preventable structure for a sandwich panel according to claim 5, wherein each of the delamination development preventing members has a base part inclined to a direction parallel to the thickness of the core and to the two surface plates, and joining parts extending from the opposite ends of the base part at an obtuse angle to the base part so as to extend along the two surface plates, respectively.

7. The delamination development preventable structure for a sandwich panel according to claim 6, wherein an acute angle between the base part and each of the two surface plates is between 30° and 45°.

8. The delamination development preventable structure for a sandwich panel according to claim 6, wherein the joining parts extend from the opposite ends of the base part along the two surface plates in opposite directions, respectively.

9. The delamination development preventable structure for a sandwich panel according to claim 1, wherein entire surfaces of the delamination development preventing members are smooth, unbent, curved surfaces.

10. The delamination development preventable structure for a sandwich panel according to claim 1 further comprising a flat auxiliary delamination development preventing member extended parallel to the two surface plates in the core at distances from the two surface plates.

11. The delamination development preventable structure for a sandwich panel according to claim 2, wherein entire surfaces of the delamination development preventing members are smooth, unbent, curved surfaces.

12. The delamination development preventable structure for a sandwich panel according to claim 3, wherein entire surfaces of the delamination development preventing members are smooth, unbent, curved surfaces.

13. The delamination development preventable structure for a sandwich panel according to claim 4, wherein entire surfaces of the delamination development preventing members are smooth, unbent, curved surfaces.

14. The delamination development preventable structure for a sandwich panel according to claim 5, wherein entire surfaces of the delamination development preventing members are smooth, unbent, curved surfaces.

15. The delamination development preventable structure for a sandwich panel according to claim 6, wherein entire surfaces of the delamination development preventing members are smooth, unbent, curved surfaces.

16. The delamination development preventable structure for a sandwich panel according to claim 7, wherein entire surfaces of the delamination development preventing members are smooth, unbent, curved surfaces.

17. The delamination development preventable structure for a sandwich panel according to claim 3 further comprising a flat auxiliary delamination development preventing member extended parallel to the two surface plates in the core at distances from the two surface plates.

18. The delamination development preventable structure for a sandwich panel according to claim 3 further comprising a flat auxiliary delamination development preventing member extended parallel to the two surface plates in the core at distances from the two surface plates.

19. The delamination development preventable structure for a sandwich panel according to claim 4 further comprising a flat auxiliary delamination development preventing member extended parallel to the two surface plates in the core at distances from the two surface plates.

20. The delamination development preventable structure for a sandwich panel according to claim 5 further comprising a flat auxiliary delamination development preventing member extended parallel to the two surface plates in the core at distances from the two surface plates.

21. The delamination development preventable structure for a sandwich panel according to claim 6 further comprising a flat auxiliary delamination development preventing member extended parallel to the two surface plates in the core at distances from the two surface plates.

22. The delamination development preventable structure for a sandwich panel according to claim 7 further comprising a flat auxiliary delamination development preventing member extended parallel to the two surface plates in the core at distances from the two surface plates.

* * * * *